(12) United States Patent
Purnhagen et al.

(10) Patent No.: US 11,217,259 B2
(45) Date of Patent: *Jan. 4, 2022

(54) AUDIO UPMIXER OPERABLE IN PREDICTION OR NON-PREDICTION MODE

(71) Applicant: DOLBY INTERNATIONAL AB, Amsterdam Zuidoost (NL)

(72) Inventors: Heiko Purnhagen, Sundbyberg (SE); Pontus Carlsson, Bromma (SE); Lars Villemoes, Järfälla (SE)

(73) Assignee: Dolby International AB, Amsterdam Zuidoost (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/931,377

(22) Filed: Jul. 16, 2020

(65) Prior Publication Data

US 2020/0395023 A1 Dec. 17, 2020

Related U.S. Application Data

(60) Continuation of application No. 16/593,235, filed on Oct. 4, 2019, now Pat. No. 10,734,002, which is a
(Continued)

(51) Int. Cl.
*G10L 19/008* (2013.01)
*G10L 19/18* (2013.01)
(Continued)

(52) U.S. Cl.
CPC ........ *G10L 19/008* (2013.01); *G10L 19/0212* (2013.01); *G10L 19/06* (2013.01);
(Continued)

(58) Field of Classification Search
CPC . G10L 19/008; G10L 19/032; G10L 19/0204; G10L 19/06; H04S 2400/03;
(Continued)

(56) References Cited

U.S. PATENT DOCUMENTS 165,587 A 7/1875 Jeantaud
6,980,933 B2 12/2005 Cheng et al.
(Continued)

FOREIGN PATENT DOCUMENTS

CN 1666572 9/2005
CN 1677490 10/2005
(Continued)

OTHER PUBLICATIONS

Avendano, C. et al "A Frequency-Domain Approach to Multichannel Upmix" JAES vol. 52, Issue 7/8, pp. 740-749, Jul. 2004, published on Jul. 15, 2004.
(Continued)

*Primary Examiner* — Alexander Krzystan

(57) ABSTRACT

The invention provides methods and devices for outputting a stereo audio signal having a left channel and a right channel. The apparatus includes a demultiplexer, decoder, and upmixer. The upmixer is configured operate either in a prediction mode or a non-prediction mode based on a parameter encoded in the audio bitstream.

13 Claims, 16 Drawing Sheets

Related U.S. Application Data continuation of application No. 16/427,735, filed on May 31, 2019, now Pat. No. 10,475,459, which is a continuation of application No. 16/222,721, filed on Dec. 17, 2018, now Pat. No. 10,360,920, which is a continuation of application No. 15/849,622, filed on Dec. 20, 2017, now Pat. No. 10,283,126, which is a continuation of application No. 14/793,297, filed on Jul. 7, 2015, now Pat. No. 9,892,736, which is a division of application No. 13/638,898, filed as application No. PCT/EP2011/055350 on Apr. 6, 2011, now Pat. No. 9,111,530.

(60) Provisional application No. 61/322,458, filed on Apr. 9, 2010.

(51) Int. Cl.
| | |
|---|---|
| *G10L 19/06* | (2013.01) |
| *H04S 3/00* | (2006.01) |
| *G10L 19/02* | (2013.01) |
| *G10L 19/16* | (2013.01) |
| *G10L 25/12* | (2013.01) |

(52) U.S. Cl.
CPC .......... *G10L 19/167* (2013.01); *G10L 19/18* (2013.01); *H04S 3/008* (2013.01); *G10L 25/12* (2013.01); *H04S 2400/01* (2013.01)

(58) Field of Classification Search
CPC .... H04S 3/02; H04S 2420/03; H04S 2400/01; H04R 5/00
USPC .......... 381/22, 19, 20, 21, 23; 704/500, 501, 704/504
See application file for complete search history.

(56) References Cited

U.S. PATENT DOCUMENTS

| | | | |
|---|---|---|---|
| 8,346,547 | B1 | 1/2013 | Tang |
| 8,655,670 | B2 | 2/2014 | Purnhagen |
| 8,948,404 | B2 | 2/2015 | Kim |
| 9,082,395 | B2 | 7/2015 | Heiko |
| 2005/0197831 | A1 | 9/2005 | Edler et al. |
| 2006/0047523 | A1 | 3/2006 | Ojanpera |
| 2006/0253276 | A1 | 11/2006 | Kang |
| 2007/0016415 | A1 | 1/2007 | Thumpudi |
| 2007/0203697 | A1 | 8/2007 | Pang |
| 2008/0136686 | A1 | 6/2008 | Feiten |
| 2009/0006103 | A1 | 1/2009 | Koishida |
| 2009/0048852 | A1 | 2/2009 | Burns et al. |
| 2009/0063140 | A1 | 3/2009 | Villemoes |
| 2009/0083040 | A1 | 3/2009 | Myburg et al. |
| 2009/0198356 | A1 | 8/2009 | Goodwin |
| 2009/0210234 | A1 | 8/2009 | Sung |
| 2009/0216542 | A1 | 8/2009 | Pang |
| 2010/0010807 | A1 | 1/2010 | Oh |
| 2010/0014679 | A1 | 1/2010 | Kim |
| 2010/0046759 | A1 | 2/2010 | Pang |
| 2010/0057447 | A1 | 3/2010 | Ehara |
| 2010/0070284 | A1 | 3/2010 | Oh |
| 2010/0086030 | A1 | 4/2010 | Chen |
| 2010/0262427 | A1 | 10/2010 | Chivukula et al. |
| 2011/0178795 | A1 | 7/2011 | Bayer |
| 2011/0257981 | A1 | 10/2011 | Beack |
| 2012/0002818 | A1 | 1/2012 | Heiko et al. |
| 2012/0245947 | A1 | 9/2012 | Neuendorf |
| 2013/0030819 | A1 | 1/2013 | Purnhagen |
| 2016/0133273 | A1* | 5/2016 | Kaniewska ......... G10L 21/0388 704/205 |
| 2018/0108366 | A1* | 4/2018 | Villemoes ............... G10L 19/26 |

FOREIGN PATENT DOCUMENTS

| | | |
|---|---|---|
| CN | 1922656 | 2/2007 |
| CN | 101031959 | 9/2007 |
| CN | 101067931 | 11/2007 |
| CN | 101160619 | 4/2008 |
| CN | 101202043 | 6/2008 |
| CN | 101253557 | 8/2008 |
| CN | 101529501 | 9/2009 |
| CN | 101583994 | 11/2009 |
| EP | 1107232 | 6/2001 |
| EP | 1803325 B1 | 11/2008 |
| EP | 2137725 | 12/2009 |
| EP | 2144230 | 1/2010 |
| EP | 2144231 | 1/2010 |
| JP | 04506141 | 10/1992 |
| JP | 2005521921 | 7/2005 |
| JP | 2007520748 A | 7/2007 |
| JP | 2007525716 | 9/2007 |
| JP | 2008516290 | 5/2008 |
| JP | 2008517337 | 5/2008 |
| JP | 2009536360 A | 10/2009 |
| KR | 20080027129 | 3/2008 |
| RU | 2174714 | 10/2001 |
| RU | 2380766 | 1/2010 |
| WO | 2006091150 A1 | 8/2006 |
| WO | 2007128523 | 11/2007 |
| WO | 2007140809 A1 | 12/2007 |
| WO | 2008046531 A1 | 4/2008 |
| WO | 2008063035 A1 | 5/2008 |
| WO | 2009038512 A1 | 3/2009 |
| WO | 2009049895 A1 | 4/2009 |
| WO | 2009049896 | 4/2009 |
| WO | 2009084920 A1 | 7/2009 |
| WO | 2009141775 | 11/2009 |

OTHER PUBLICATIONS

Baumgarte, Frank "Enhanced Dynamic Range Control Metadata", MPEG Meeting, Apr. 17, 2013, Motion Picture Expert Group or ISO/IEC JTC1/SC29/WG11.

Breebaart, J. et al "Spatial Audio Processing—Ch. 6 MPEG Surround" in "Spatial Audio Processing", Jan. 1, 2007, John Wiley & Sons, pp. 93-115.

Carlsson, P. et al. "Technical Description of CE on Improved Stereo Coding in USAC" MPEG meeting Jul. 22, 2010, Geneva, Motion Picture Expert Group or ISO/IEC JTC1/SC29/WG11.

Chen, S. et al. "Estimating Spatial Cues for Audio Coding in MDCT Domain" ICME 2009, pp. 53-56.

Chen, S. et al. "Spatial Parameters for Audio Coding: MDCT Domain Analysis and Synthesis" Springer, published in Jul. 2009.

Chen, S. et al., "Analysis and Synthesis of Spatial Parameters Using MDCT" Multimedia and Ubiquitous Engineering published in Jun. 2009, pp. 18-21. cited by applicant.

Chen, S. et al., "Analysis and Synthesis of Spatial Parameters Using MDCT" Multimedia and Ubiquitous Engineering published in Jun. 2009, pp. 18-21.

Derrien, O. et al. "A New Model-Based Algorithm for Optimizing the MPEG-AAC in MS-Stereo" IEEE Signal Processing Society, published in Nov. 2008, vol. 16, Issue 8, pp. 1373-1382.

Goodwin, M. et al "A Frequency-Domain Framework for Spatial Audio Coding Based on Universal Spatial Cues" AES Convention Paper 6751, presented at the 120th Convention, May 20-23, 2006, Paris, France, pp. 1-12.

Heiko, P. et al. "MPEG 2009/M16921" Technical Description of Propposed Unified Stereo Coding in USAC, Oct. 30, 2009.

Herre, J. et al. "MPEG Surround—The ISO/MPEG Standard for Efficient and Compatible Multi-Channel Audio Coding" AES Convention Paper Presented at the 122nd Convention May 5-8, 2007, Vienna, Austria.

Johnston, J.D. et al "Sum-Difference Stereo Transform Coding" IEEE International Conference on Acoustics, Speech, and Signal Processing, Mar. 23-26, 1992, pp. 569-572, vol. 2.

Kruger, H. et al "A New Approach for Low-Delay Joint-Stereo Coding" ITG Facthtagung Sprachkommunikation Oct. 8-10, 2008, pp. 1-4.

(56) References Cited

OTHER PUBLICATIONS

Kuech, F. et al "Description of the Fraunhofer IIS Submission for the DRC CFP" MPEG Meeting Oct. 28-Nov. 1, 2013, Geneva, Motion Expert Group or ISO/IEC JTC1/SC29/WG11.

Neuendorf, M. et al "MPEG Unified Speech and Audio Coding—The ISO/MPEG Standard for High-Efficiency Audio Coding of All Content Types" Audio Engineering Society Convention 132, Apr. 26, 2012.

Neuendorf, M. et al "The ISO/MPEG Unified Speech and Audio Coding Standard—Consistent High Quality for All Content Types and at all Bit Rates" Journal of the Audio Engineering Society, vol. 61, Issue 12, pp. 956-977, Dec. 2013.

Ofir, H. et al. "Audio Packet Loss Concealment in a Combined MDCT-MDST Domain" IEEE Signal Processing Letter, vol. XX, No. Y, 2007.

Pang, Hee-Suk, "Clipping Prevention Scheme for MPEG Surround" ETRI Journal, Electronics and Telecommunications Research Institute, vol. 30, No. 4, Aug. 2008, pp. 606-608.

Purnhagen, H. et al. "Technical Description of Proposed Unified Stereo Coding in USAC" MPEG Meeting Oct. 23, 2009, Motion Picture Expert Group or ISO/IEC JTC1/SC29/WG11.

Purnhagen, Heiko "Low Complexity Parametric Stereo Coding in MPEG-4" Proc. of the 7th Int. Conference on Digital Audio Effects, Naples, Italy, Oct. 5-8, 2004, pp. 163-168.

Robinson, C. et al "Dynamic Range Control via Metadata 5028 (J-1) AN Audio Engineering Society Preprint, Dynamic Range Control via Metadata" AES, presented at the 107th Convention, Sep. 24-27, 1999. pp 1-14.

Schumers, E. et al. "Low Complexity Parametric Stereo Coding" AES presented at the 116th Convention, May 8-11, 2004, Berlin, Germany.

Suresh, K. et al., "Parametric Stereo Coder with Only MDCT Domain Computations" 2009 IEEE.

Zhang, T. et al. "On the Relationship of MDCT Transform Kernels in Dolby AC-3" Audio, Language and Image Processing, published in Jul. 2008, pp. 839-842.

\* cited by examiner

AUDIO UPMIXER OPERABLE IN PREDICTION OR NON-PREDICTION MODE

CROSS-REFERENCE TO RELATED APPLICATIONS

The present application is a continuation of U.S. patent application Ser. No. 16/593,235, filed Oct. 4, 2019, which is a continuation of U.S. patent application Ser. No. 16/427,735, filed May 31, 2019, now U.S. Pat. No. 10,475,459, which is a continuation of U.S. patent application Ser. No. 16/222,721, filed Dec. 17, 2018, now U.S. Pat. No. 10,360,920, which is a continuation of U.S. patent application Ser. No. 15/849,622, filed Dec. 20, 2017, now U.S. Pat. No. 10,283,126, which is a continuation of U.S. patent application Ser. No. 14/793,297, filed Jul. 7, 2015, now U.S. Pat. No. 9,892,736, which is a divisional of U.S. patent application Ser. No. 13/638,898, filed Oct. 1, 2012, now U.S. Pat. No. 9,111,530, which is the US national stage of International Patent Application No. PCT/EP2011/055350, filed Apr. 6, 2011, which claims priority to U.S. Provisional Patent Application No. 61/322,458, filed Apr. 9, 2010, each of which is hereby incorporated by reference in its entirety.

TECHNICAL FIELD

The invention disclosed herein generally relates to stereo audio coding and more precisely to techniques for stereo coding using complex prediction in the frequency domain.

BACKGROUND OF THE INVENTION

Joint coding of the left (L) and right (R) channels of a stereo signal enables more efficient coding compared to independent coding of L and R. A common approach for joint stereo coding is mid/side (M/S) coding. Here, a mid (M) signal is formed by adding the L and R signals, e.g. the M signal may have the form $$M=(L+R)/2$$

Also, a side (S) signal is formed by subtracting the two channels L and R, e.g., the S signal may have the form $$S=(L-R)/2$$

In the case of M/S coding, the M and S signals are coded instead of the L and R signals.

In the MPEG (Moving Picture Experts Group) AAC (Advanced Audio Coding) standard (see standard document ISO/IEC 13818-7), L/R stereo coding and M/S stereo coding can be chosen in a time-variant and frequency-variant manner. Thus, the stereo encoder can apply L/R coding for some frequency bands of the stereo signal, whereas M/S coding is used for encoding other frequency bands of the stereo signal (frequency variant). Moreover, the encoder can switch over time between L/R and M/S coding (time-variant). In MPEG AAC, the stereo encoding is carried out in the frequency domain, more particularly the MDCT (modified discrete cosine transform) domain. This allows choosing adaptively either L/R or M/S coding in a frequency and also time variable manner.

Parametric stereo coding is a technique for efficiently coding a stereo audio signal as a monaural signal plus a small amount of side information for stereo parameters. It is part of the MPEG-4 Audio standard (see standard document ISO/IEC 14496-3). The monaural signal can be encoded using any audio coder. The stereo parameters can be embedded in the auxiliary part of the mono bit stream, thus achieving full forward and backward compatibility. In the decoder, it is the monaural signal that is first decoded, after which the stereo signal is reconstructed with the aid of the stereo parameters. A decorrelated version of the decoded mono signal, which has zero cross correlation with the mono signal, is generated by means of a decorrelator, e.g., an appropriate all-pass filter which may include one or more delay lines. Essentially, the decorrelated signal has the same spectral and temporal energy distribution as the mono signal. The monaural signal together with the decorrelated signal are input to the upmix process which is controlled by the stereo parameters and which reconstructs the stereo signal. For further information, see the paper "Low Complexity Parametric Stereo Coding in MPEG-4", H. Purnhagen, Proc. of the $7^{th}$ Int. Conference on Digital Audio Effects (DAFx'04), Naples, Italy, Oct. 5-8, 2004, pages 163-168.

MPEG Surround (MPS; see ISO/IEC 23003-1 and the paper "MPEG Surround—The ISO/MPEG Standard for Efficient and Compatible Multi-Channel Audio Coding", J. Herre et al., Audio Engineering Convention Paper 7084, $122^{nd}$ Convention, May 5-8, 2007) allows combining the principles of parametric stereo coding with residual coding, substituting the decorrelated signal with a transmitted residual and hence improving the perceptual quality. Residual coding may be achieved by downmixing a multi-channel signal and, optionally, by extracting spatial cues. During the process of downmixing, residual signals representing the error signal are computed and then encoded and transmitted. They may take the place of the decorrelated signals in the decoder. In a hybrid approach, they may replace the decorrelated signals in certain frequency bands, preferably in relatively low bands.

According to the current MPEG Unified Speech and Audio Coding (USAC) system, of which two examples are shown in FIG. 1, the decoder comprises a complex-valued quadrature mirror filter (QMF) bank located downstream of the core decoder. The QMF representation obtained as the output of the filter bank is complex—thus oversampled by a factor two—and can be arranged as a downmix signal (or, equivalently, mid signal) M and a residual signal D, to which an upmix matrix with complex entries is applied. The L and R signals (in the QMF domain) are obtained as:

$$\begin{bmatrix} L \\ R \end{bmatrix} = g \begin{bmatrix} 1-\alpha & 1 \\ 1+\alpha & -1 \end{bmatrix} \begin{bmatrix} M \\ D \end{bmatrix}$$

where g is a real-valued gain factor and $\alpha$ is a complex-valued prediction coefficient. Preferably, $\alpha$ is chosen such that the energy of the residual signal D is minimized. The gain factor may be determined by normalization, that is, to ensure that the power of the sum signal is equal to the sum of the powers of the left and right signals. The real and imaginary parts of each of the L and R signals are mutually redundant—in principle, each of them can be computed on the basis of the other—but are beneficial for enabling the subsequent application of a spectral band replication (SBR) decoder without audible aliasing artifacts occurring. The use of an oversampled signal representation may also, for similar reasons, be chosen with the aim of preventing artifacts connected with other time- or frequency-adaptive signal processing (not shown), such as the mono-to-stereo upmix. Inverse QMF filtering is the last processing step in the decoder. It is noted that the band-limited QMF representation of the signal allows for band-limited residual techniques and "residual fill" techniques, which may be integrated into decoders of this type.

The above coding structure is well suited for low bit rates, typically below 80 kb/s, but is not optimal for higher bit rates with respect to computational complexity. More precisely, at higher bitrates, the SBR tool is typically not utilized (as it would not improve coding efficiency). Then, in a decoder without a SBR stage, only the complex-valued upmix matrix motivates the presence of the QMF filter bank, which is computationally demanding and introduces a delay (at a frame length of 1024 samples, the QMF analysis/synthesis filter bank introduces a delay of 961 samples). This clearly indicates a need for a more efficient coding structure.

SUMMARY OF THE INVENTION

It is an object of the present invention to provide methods and apparatus for stereo coding that are computationally efficient also in the high bitrate range.

The invention fulfils this object by providing a coder and decoder, coding and decoding methods and computer program products for coding and decoding, respectively, as defined by the independent claims. The dependent claims define embodiments of the invention.

In a first aspect, the invention provides a decoder system for providing a stereo signal by complex prediction stereo coding, the decoder system comprising:

an upmix adapted to generate the stereo signal based on first frequency-domain representations of a downmix signal (M) and a residual signal (D), each of the first frequency-domain representations comprising first spectral components representing spectral content of the corresponding signal expressed in a first subspace of a multidimensional space, the upmix stage comprising:

a module for computing a second frequency-domain representation of the downmix signal based on the first frequency-domain representation thereof, the second frequency-domain representation comprising second spectral components representing spectral content of the signal expressed in a second subspace of the multidimensional space that includes a portion of the multidimensional space not included in the first subspace;

a weighted summer for computing a side signal (S) on the basis of the first and second frequency-domain representations of the downmix signal, the first frequency-domain representation of the residual signal and a complex prediction coefficient ($\alpha$) encoded in the bit stream signal; and a sum-and-difference stage for computing the stereo signal on the basis of the first frequency-domain representation of the downmix signal and the side signal, wherein the upmix stage is further operable in a pass-through mode, in which said downmix and residual signals are supplied to the sum-and-difference directly.

In a second aspect, the invention provides an encoder system for encoding a stereo signal by a bit stream signal by complex prediction stereo coding, including:

an estimator for estimating a complex prediction coefficient;

a coding stage operable to:

(a) transform the stereo signal into a frequency-domain representation of a downmix and a residual signal, in a relationship determined by the value of the complex prediction coefficient;

and a multiplexer for receiving output from the coding stage and the estimator and encoding this by said bit stream signal.

In a third and a fourth aspect of the invention, there are provided methods for encoding a stereo signal into a bit stream and for decoding a bit stream into at least one stereo signal. The technical features of each method are analogous to those of the encoder system and the decoder system, respectively. In a fifth and sixth aspect, the invention further provides a computer program product containing instructions for executing each of the methods on a computer.

The invention benefits from the advantages of unified stereo coding in the MPEG USAC system. These advantages are preserved also at higher bit rates, at which SBR is typically not utilized, without the significant increase in computational complexity that would accompany a QMF-based approach. This is possible because the critically sampled MDCT transform, which is the basis of the MPEG USAC transform coding system, can be used for complex prediction stereo coding as provided by the invention, at least in cases where the code audio bandwidths of the downmix and residual channels are the same and the upmix process does not include decorrelation. This means that an additional QMF transform is not required any longer. A representative implementation of complex-prediction stereo coding in the QMF domain would actually increase the number of operations per unit time significantly compared to traditional L/R or M/S stereo. Thus, the coding apparatus according to the invention appear to be competitive at such bitrates, providing high audio quality at moderate computational expense.

As the skilled person realizes, the fact that the upmix stage is further operable in a pass-through mode enables the decoder to adaptively decode according to conventional direct or joint coding and complex prediction coding, as determined on the encoder side. Hence, in those cases where the decoder cannot positively increase the level of quality beyond that of conventional direct L/R stereo coding or joint M/S stereo coding, it can at least guarantee that the same level is maintained. Thus, a decoder according to this aspect of the invention may, from a functional point of view, be regarded as a superset in relation to the background art.

As an advantage over QMF-based prediction-coded stereo, perfect reconstruction of the signal is possible (apart from quantization errors, which can be made arbitrarily small).

Thus, the invention provides coding apparatus for transform-based stereo coding by complex prediction. Preferably, an apparatus according to the invention is not limited to complex prediction stereo coding, but is operable also in a direct L/R stereo coding or joint M/S stereo coding regime according to the background art, so that it is possible to select the most suitable coding method for a particular application or during a particular time interval.

An oversampled (e.g., complex) representation of the signal, including both said first and said second spectral components, is used as a basis for the complex prediction according to the invention, and hence, modules for computing such oversampled representation are arranged in the encoder system and the decoder system according to the invention. The spectral components refer to first and second subspaces of a multidimensional space, which may be the set of time-dependent functions on an interval of given length (e.g., a predefined time frame length) sampled at a finite sampling frequency. It is well-known that functions in this particular multidimensional space may be approximated by a finite weighted sum of base functions.

As the skilled person will appreciate, an encoder adapted to cooperate with a decoder is equipped with equivalent modules for providing the oversampled representation on which the prediction coding is based, so as to enable faithful reproduction of the encoded signal. Such equivalent modules may be identical or similar modules or modules having identical or similar transfer characteristics. In particular, the modules in the encoder and decoder, respectively, may be similar or dissimilar processing units executing respective computer programs that perform equivalent sets of mathematical operations.

In some embodiments of the decoder system or of the encoder system, the first spectral components have real values expressed in the first subspace, and the second spectral components have imaginary values expressed in the second subspace. The first and second spectral components together form a complex spectral representation of the signal. The first subspace may be the linear span of a first set of base functions, while the second subspace may be the linear span of a set of second base functions, some of which are linearly independent of the first set of base functions.

In one embodiment, the module for computing the complex representation is a real-to-imaginary transform, i.e., a module for computing imaginary parts of the spectrum of a discrete-time signal on the basis of a real spectral representation of the signal. The transform may be based on exact or approximate mathematical relations, such as formulas from harmonic analysis or heuristic relations.

In some embodiments of the decoder system or of the encoder system, the first spectral components are obtainable by a time-to-frequency domain transform, preferably a Fourier transform, of a discrete time-domain signal, such as by a discrete cosine transform (DCT), a modified discrete cosine transform (MDCT), a discrete sine transform (DST), a modified discrete sine transform (MDST), a fast Fourier transform (FFT), a prime-factor-based Fourier algorithm or the like. In the first four cases, the second spectral components may then be obtainable by DST, MDST, DCT and MDCT, respectively. As is well known, the linear span of cosines that are periodic on the unit interval forms a subspace that is not entirely contained in the linear span of sines periodic on the same interval. Preferably, the first spectral components are obtainable by MDCT and the second spectral components are obtainable by MDST.

In one embodiment, the decoder system includes at least one temporal noise shaping module (TNS module, or TNS filter), which is arranged upstream of the upmix stage. Generally speaking, the use of TNS increases the perceived audio quality for signals with transient-like components, and this also applies to embodiments of the inventive decoder system featuring TNS. In conventional L/R and M/S stereo coding, the TNS filter may be applied as a last processing step in the frequency domain, directly before the inverse transform. In case of complex-prediction stereo coding, however, it is often advantageous to apply the TNS filter on the downmix and residual signals, that is, before the upmix matrix. Put differently, the TNS is applied to linear combinations of the left and right channels, which has several advantages. Firstly, it may turn out in a given situation that TNS is only beneficial for, say, the downmix signal. Then, TNS filtering can be suppressed or omitted for the residual signal and, what may mean more economic use of the available bandwidth, TNS filter coefficients need only be transmitted for the downmix signal. Secondly, the computation of the oversampled representation of the downmix signal (e.g., MDST data being derived from the MDCT data so as to form a complex frequency-domain representation), which is needed in complex prediction coding, may require that at time-domain representation of the downmix signal be computable. This in turn means that the downmix signal is preferably available as a time sequence of MDCT spectra obtained in a uniform manner. If the TNS filter were applied in the decoder after the upmix matrix, which converts a downmix/residual representation into a left/right representation, only a sequence of TNS residual MDCT spectra of the downmix signal would be available. This would make efficient calculation of the corresponding MDST spectra very challenging, especially if left and right channels were using TNS filters with different characteristics.

It is emphasized that the availability of a time sequence of MDCT spectra is not an absolute criterion in order to obtain an MDST representation fit to serve as a basis for complex prediction coding. In addition to experimental evidence, this fact may be explained by the TNS being generally applied only to higher frequencies, such as above a few kilohertz, so that the residual signal filtered by TNS approximately corresponds to the non-filtered residual signal for lower frequencies. Thus, the invention may be embodied as a decoder for complex-prediction stereo coding, in which the TNS filters have a different placement than upstream of the upmix stage, as indicated below.

In one embodiment, the decoder system includes at least one further TNS module located downstream of the upmix stage. By means of a selector arrangement, either the TNS module(s) upstream of the upmix stage or the TNS module(s) downstream of the upmix stage. Under certain circumstances, the computation of the complex frequency-domain representation does not require that a time-domain representation of the downmix signal be computable. Moreover, as set forth above, the decoder may be selectively operable in a direct or joint coding mode, not applying complex prediction coding, and then it may be more suitable to apply the conventional localization of the TNS modules, that is, as one of the last processing steps in the frequency domain.

In one embodiment, the decoder system is adapted to economize processing resources, and possibly energy, by deactivating the module for computing a second frequency-domain representation of the downmix signal when the latter is not necessary. It is supposed that the downmix signal is partitioned into successive time blocks, each of which is associated with a value of the complex prediction coefficient. This value may be determined by a decision taken for each time block by an encoder cooperating with the decoder. Furthermore, in this embodiment, the module for computing a second frequency-domain representation of the downmix signal is adapted to deactivate itself if, for a given time block, the absolute value of the imaginary part of the complex prediction coefficient is zero or is smaller than a predetermined tolerance. Deactivation of the module may imply that no second frequency-domain representation of the downmix signal is computed for this time block. If deactivation did not take place, the second frequency-domain representation (e.g., a set of MDST coefficients) would be multiplied by zero or by a number of substantially the same order of magnitude as the machine epsilon (round-off unit) of the decoder or some other suitable threshold value.

In a further development of the preceding embodiment, economization of processing resources is achieved on a sublevel of the time block into which the downmix signal is partitioned. For instance, such a sublevel within a time block may be a frequency band, wherein the encoder determines a value of the complex prediction coefficient for each frequency band within a time block. Similarly, the module for producing a second frequency-domain representation is adapted to suppress its operation for a frequency band in a time block for which the complex prediction coefficient is zero or has magnitude less than a tolerance.

In one embodiment, the first spectral components are transform coefficients arranged in one or more time blocks of transform coefficients, each block generated by application of a transform to a time segment of a time-domain signal. Further, the module for computing a second frequency-domain representation of the downmix signal is adapted to:

derive one or more first intermediate components from at least some of the first spectral components;

form a combination of said one or more first spectral components according to at least a portion of one or more impulse responses to obtain one or more second intermediate components; and derive said one or more second spectral components from said one or more second intermediate components.

This procedure achieves a computation of the second frequency-domain representation directly from the first frequency-domain representation, as described in greater detail in U.S. Pat. No. 6,980,933 B2, notably columns 8-28 and in particular equation 41 therein. As the skilled person realizes, the computation is not performed via the time domain, as opposed to, e.g., inverse transformation followed by a different transformation.

For an exemplary implementation of complex-prediction stereo coding according to the invention, it has been estimated that the computational complexity increases only slightly (significantly less than the increase caused by complex-prediction stereo coding in the QMF domain) compared to traditional L/R or M/S stereo. An embodiment of this type including exact computation of the second spectral components introduces a delay that is typically only a few percent longer than that introduced by a QMF-based implementation (assuming the time block length to be 1024 samples and comparing with the delay of the hybrid QMF analysis/synthesis filter bank, which is 961 samples).

Suitably, in at least some of the previous embodiment, the impulse responses are adapted to the transform by which the first frequency-domain representation is obtainable, and more precisely in accordance with the frequency response characteristics thereof.

In some embodiments, the first frequency-domain representation of the downmix signal is obtained by a transform which is being applied in connection with one or more analysis window functions (or cut-off functions, e.g., rectangular window, sine window, Kaiser-Bessel-derived window, etc.), one aim of which is to achieve a temporal segmentation without introducing a harmful amount of noise or changing the spectrum in an undesirable manner. Possibly, such window functions are partially overlapping. Then, preferably, the frequency response characteristics of the transform are dependent on characteristics of said one or more analysis window functions.

Still referring to the embodiments featuring computation of the second frequency-domain representation within the frequency domain, it is possible to decrease the computational load involved by using an approximate second frequency-domain representation. Such approximation may be achieved by not requiring complete information on which to base the computation. By the teachings of U.S. Pat. No. 6,980,933 B2, for instance, first frequency-domain data from three time blocks are required for exact calculation of the second frequency-domain representation of the downmix signal in one block, namely a block contemporaneous with the output block, a preceding block and a subsequent block. For the purpose of complex prediction coding according to the present invention, suitable approximations may be obtained by omitting—or replacing by zero—data emanating from the subsequent block (whereby operation of the module may become causal, that is, does not contribute a delay) and/or from the preceding block, so that the computation of the second frequency-domain representation is based on data from one or two time blocks only. It is noted that even though the omission of input data may imply a rescaling of the second frequency-domain representation—in the sense that, e.g., it no longer represents equal power—it can yet be used as a basis for complex prediction coding as long as it is computed in an equivalent manner at both the encoder and decoder ends, as noted above. Indeed, a possible rescaling of this kind will be compensated by a corresponding change of the prediction coefficient value.

Yet another approximate method for computing a spectral component forming part of the second frequency-domain representation of the downmix signal may include combination of at least two components from the first frequency-domain representation. The latter components may be adjacent with respect to time and/or frequency. As alternative, they may be combined by finite impulse response (FIR) filtering, with relatively few taps. For example, in a system applying a time block size of 1024, such FIR filters may include 2, 3, 4 etc. taps. Descriptions of approximate computation methods of this nature may be found, e.g., in US 2005/0197831 A1. If a window function giving relatively smaller weights to the neighborhood of each time block boundary is used, e.g., a non-rectangular function, it may be expedient to base the second spectral components in a time block only on combinations of first spectral components in the same time block, implying that not the same amount of information is available for the outermost components. The approximation error possibly introduced by such practice is to some extent suppressed or concealed by the shape of the window function.

In one embodiment of a decoder, which is designed to output a time-domain stereo signal, there is included a possibility of switching between direct or joint stereo coding and complex prediction coding. This is achieved by the provision of:

a switch that is selectively operable either as a pass-through stage (not modifying the signals) or as a sum-and-difference transform;

an inverse transform stage for performing a frequency-to-time transform; and a selector arrangement for feeding the inverse transform stage with either a directly (or jointly) coded signal or with a signal coded by complex prediction.

As the skilled person realizes, such flexibility on the part of the decoder gives the encoder latitude to choose between conventional direct or joint coding and complex prediction coding. Hence, in cases where the level of quality of conventional direct L/R stereo coding or joint M/S stereo coding cannot be surpassed, this embodiment can at least guarantee that the same level is maintained. Thus, the decoder according to this embodiment may be regarded as a superset with respect to the related art.

Another group of embodiments of the decoder system effect computation of the second spectral components in the second frequency-domain representation via the time domain. More precisely, an inverse of the transform by which the first spectral components were obtained (or are obtainable) is applied and is followed by a different transform having as output the second spectral components. In particular, an inverse MDCT may be followed by a MDST. In order to reduce the number of transforms and inverse transforms, the output of the inverse MDCT may, in such an embodiment, be fed to both the MDST and to the output terminals (possibly preceded by further processing steps) of the decoding system.

For an exemplary implementation of complex-prediction stereo coding according to the invention, it has been estimated that the computational complexity increases only slightly (still significantly less than the increase caused by complex-prediction stereo coding in the QMF domain) compared to traditional L/R or M/S stereo.

As a further development of the embodiment referred to in the preceding paragraph, the upmix stage may comprise a further inverse transform stage for processing the side signal. Then, the sum-and-difference stage is supplied with a time-domain representation of the side signal, generated by said further inverse transform stage, and a time-domain representation of the downmix signal, generated by the inverse transform stage already referred to. It is recalled that, advantageously from the point of view of computational complexity, the latter signal is supplied to both the sum-and-difference stage and said different transform stage referred to above.

In one embodiment, a decoder designed to output a time-domain stereo signal includes a possibility of switching between direct L/R stereo coding or joint M/S stereo coding and complex prediction stereo coding. This is achieved by the provision of:
  a switch operable either as a pass-through stage or as a sum-and-difference stage;
  a further inverse transform stage for computing a time-domain representation of the side signal;
  a selector arrangement for connecting the inverse transform stages to either a further sum-and-difference stage connected to a point upstream of the upmix stage and downstream of the switch (preferably when the switch has been actuated to function as a pass filter, as may be the case in decoding a stereo signal generated by complex prediction coding) or a combination of a downmix signal from the switch and a side signal from the weighted summer (preferably when the switch has been actuated to function as a sum-and-difference stage, as may be the case in decoding a directly coded stereo signal).

As the skilled person realizes, this gives the encoder latitude to choose between conventional direct or joint coding and complex prediction coding, which means that a level of quality at least equivalent to that of direct or joint stereo coding can be guaranteed.

In one embodiment, of the encoder system according to the second aspect of the invention may comprise an estimator for estimating the complex prediction coefficient with the aim of reducing or minimizing the signal power or average signal power of the residual signal. The minimization may take place over a time interval, preferably a time segment or time block or time frame of the signal to be encoded. The square of the amplitude may be taken as a measure of the momentary signal power, and an integral over a time interval of the squared amplitude (waveform) may be taken as a measure of the average signal power in that interval. Suitably, the complex prediction coefficient is determined on a time-block and frequency-band basis, that is, its value is set in such manner that it reduces the average power (i.e., total energy) of the residual signal in that time block and frequency band. In particular, modules for estimating parametric stereo coding parameters such as IID, ICC and IPD or similar ones, may provide output on which the complex prediction coefficient can be computed according to mathematical relations known to the skilled person.

In one embodiment, the coding stage of the encoder system is operable, further, to function as pass-through stage so as to enable direct stereo coding. By selecting direct stereo coding in situations where this is expected to provide a higher quality, the encoder system can guarantee that the coded stereo signal has at least the same quality as in direct coding. Similarly, in situations where the greater computational effort incurred by complex prediction coding is not motivated by a significant quality increase, an option of economizing computational resources is thus readily available to the encoder system. The decision between joint, direct, real-prediction and complex-prediction coding in the coder is generally based on a rate/distortion optimization rationale.

In one embodiment, the encoder system may comprise a module for computing a second frequency-domain representation directly (that is, without applying an inverse transform into the time domain and without using the time-domain data of the signal) based on the first spectral components. In relation to the corresponding embodiments of the decoder system described above, this module may have an analogous structure, namely comprise the analogous processing operations but in a different order, so that the encoder is adapted to output data suitable as input on the decoder side. For the purposes of illustrating this embodiment, it is assumed that the stereo signal to be encoded comprises mid and side channels, or has been transformed into this structure, and the coding stage is adapted to receive a first frequency-domain representation. The coding stage comprises a module for computing a second frequency-domain representation of the mid channel. (The first and second frequency-domain representations referred to here are as defined above; in particular the first frequency-domain representations may MDCT representations and the second frequency-domain representation may be an MDST representation.) The coding stage further comprises a weighted summer for computing a residual signal as a linear combination formed from the side signal and the two frequency-domain representations of the mid signal weighted by the real and imaginary parts, respectively, of the complex prediction coefficient. The mid signal, or suitably the first frequency-domain representation thereof, may be used directly as a downmix signal. In this embodiment, further, the estimator determines the value of the complex prediction coefficient with the aim of minimizing the power or average power of the residual signal. The final operation (optimization) may be effected either by feedback control, wherein the estimator may receive the residual signal obtained by current prediction coefficient values to be adjusted further if needed, or, in a feed-forward manner, by computations effected directly on the left/right channels of an original stereo signal or the mid/side channels. The feed-forward method is preferred, by which the complex prediction coefficient is determined directly (particularly, in a non-iterative or non-feedback manner) based on the first and second frequency-domain representations of the mid signal and the first frequency-domain representation of the side signal. It is noted that the determination of the complex prediction coefficient may be followed by a decision whether to apply direct, joint, real-prediction or complex-prediction coding, wherein the resulting quality (preferably the perceptual quality, taking into account, e.g., signal-to-mask effects) of each available option is considered; thus, the statements above are not to be construed to the effect that no feedback mechanism exists in the encoder.

In one embodiment, the encoder system comprises modules for computing a second frequency-domain representation of the mid (or downmix) signal via the time domain. It is understood that implementation details relating to this embodiment, at least as far as the computation of the second frequency-domain representation is concerned, are similar or can be worked out analogously to corresponding decoder embodiments. In this embodiment, the coding stage comprises:

- a sum-and-difference stage for converting the stereo signal into a form comprising mid and side channels;
- a transform stage for providing a frequency-domain representation of the side channel and a complex-valued (and hence oversampled) frequency-domain representation of the mid channel; and
- a weighted summer for computing a residual signal, wherein the complex prediction coefficient is used as a weight.

Here, the estimator may receive the residual signal and determine, possibly in a feedback control fashion, the complex prediction coefficient so as to reduce or minimize the power or average of the residual signal. Preferably, however, the estimator receives the stereo signal to be encoded and determines the prediction coefficient on the basis of this. It is advantageous from the point of view of computational economy to use a critically sampled frequency-domain representation of the side channel, as the latter will not be subjected to multiplication by a complex number in this embodiment. Suitably, the transform stage may comprise an MDCT stage and an MDST stage arranged in parallel, both having the time-domain representation of the mid channel as input. Thus, an oversampled frequency-domain representation of the mid channel and a critically sampled frequency-domain representation of the side channel are produced.

It is noted that the methods and apparatus disclosed in this section may be applied, after appropriate modifications within the skilled person's abilities including routine experimentation, to coding of signals having more than two channels. The modifications into such multi-channel operability may proceed, e.g., along the lines of sections 4 and 5 in the paper by J. Herre et al. cited above.

Features from two or more embodiments outlined above can be combined, unless they are clearly complementary, in further embodiments. The fact that two features are recited in different claim does not preclude that they can be combined to advantage. Likewise, further embodiments can also be provided the omission of certain features that are not necessary or not essential for the desired purpose. As one example, the decoding system according to the invention may be embodied without a dequantization stage in cases where the coded signal to be processed is not quantized or is already available in a form suitable for processing by the upmix stage.

BRIEF DESCRIPTION OF THE DRAWINGS

The invention will now be further illustrated by the embodiments described in the next section, reference being made to the accompanying drawings, on which.

DETAILED DESCRIPTION OF EMBODIMENTS

I. Decoder Systems

Figure 1:
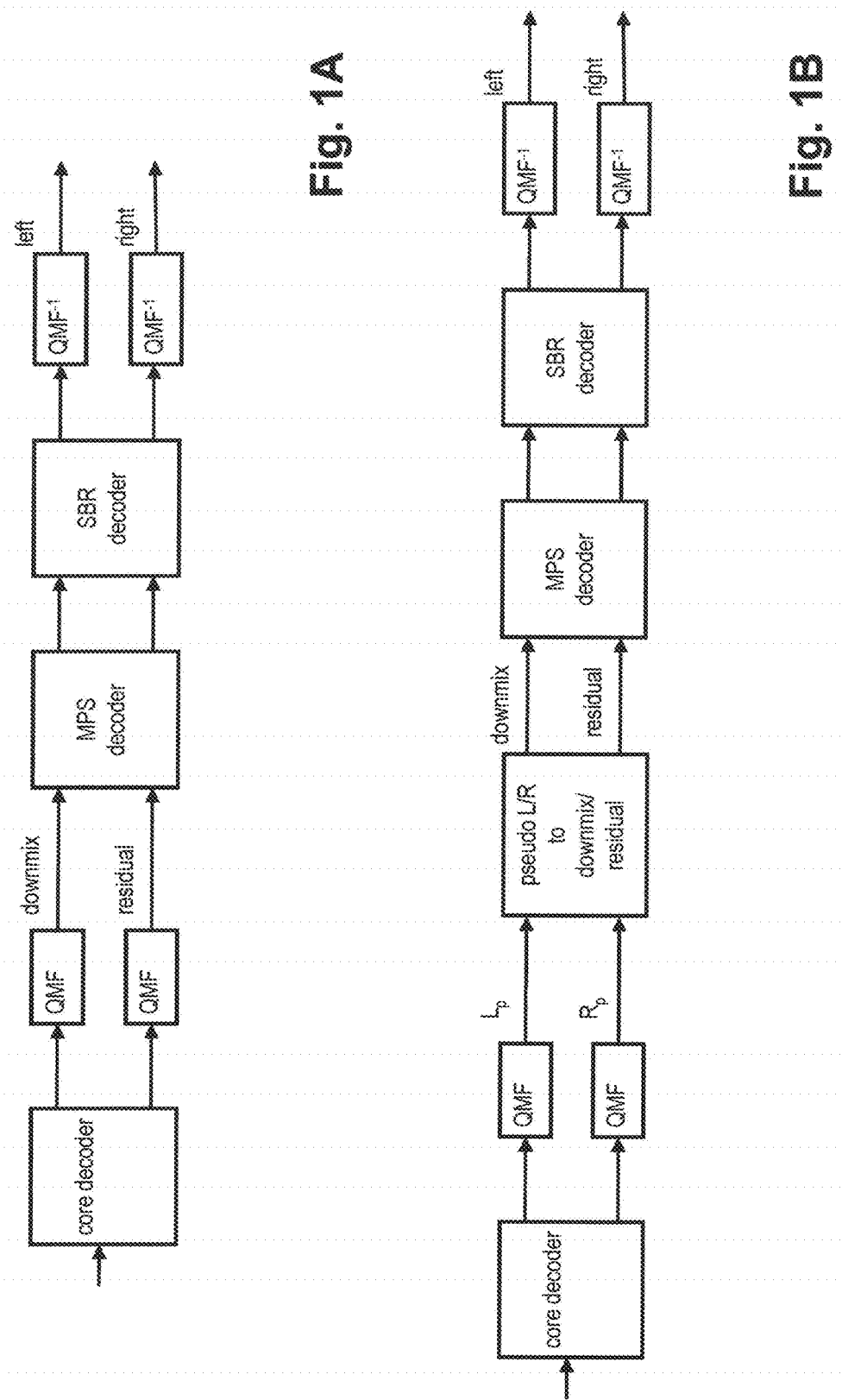
FIG. 1A is a generalized block diagram showing a QMF-based decoder according to background art.
FIG. 1B is a generalized block diagram showing a QMF-based decoder according to background art.
Figure 2:
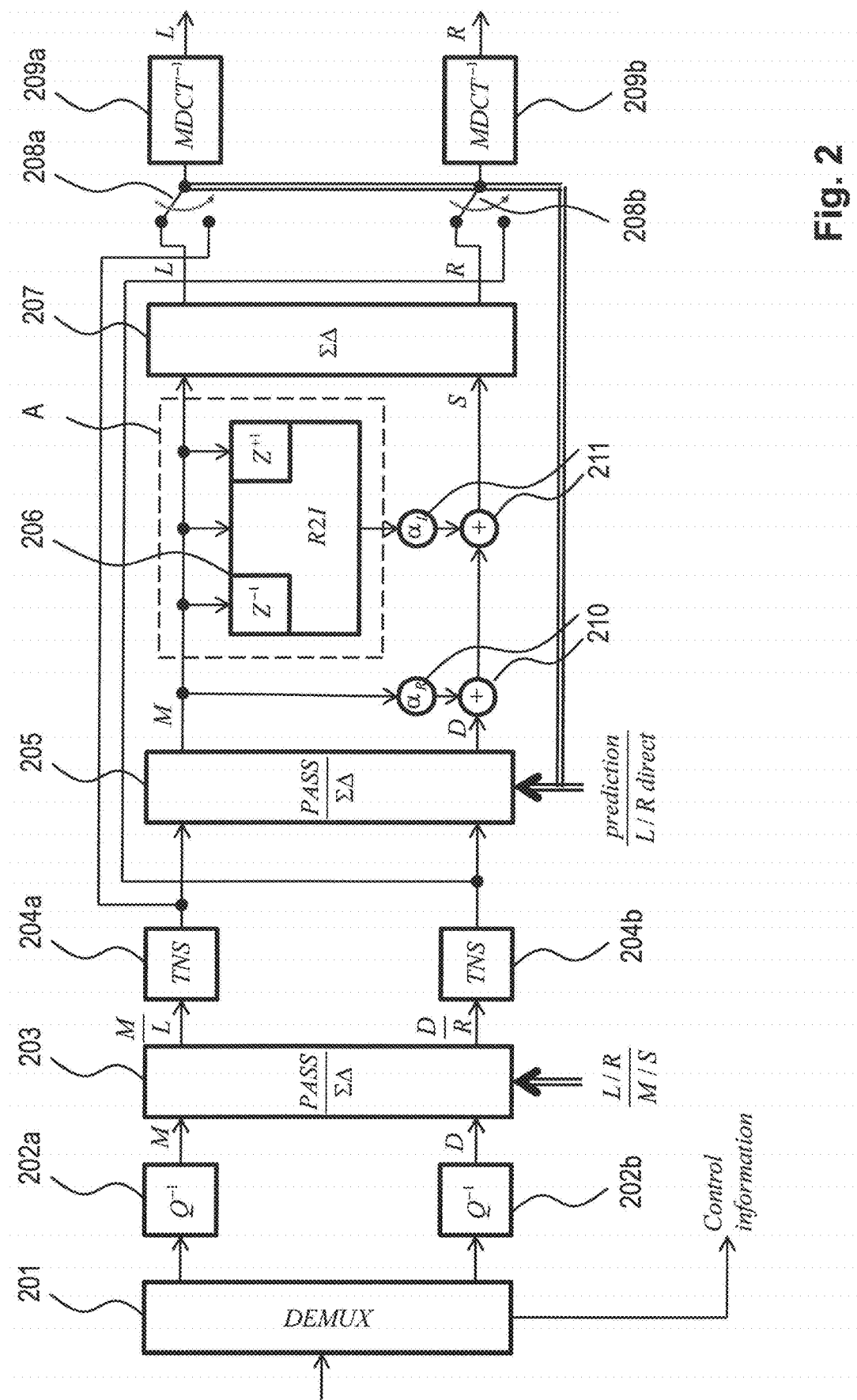
FIG. 2 is a generalized block diagram of an MDCT-based stereo decoder system with complex prediction, according to an embodiment of the present invention, in which the complex representation of a channel of the signal to be decoded is computed in the frequency domain.

FIG. 2 shows, in the form of a generalized block diagram, a decoding system for decoding a bit stream comprising at least one value of a complex prediction coefficient $\alpha = \alpha_B + i\alpha_I$ and an MDCT representation of a stereo signal having downmix M and residual D channels. The real and imaginary parts $\alpha_B, \alpha_I$ of the prediction coefficient may have been quantized and/or coded jointly. Preferably however, the real and imaginary parts are quantized independently and uniformly, typically with a step size of 0.1 (dimensionless number). The frequency-band resolution used for the complex prediction coefficient is not necessarily the same as the resolution for scale factors bands (sfb; i.e., a group of MDCT lines that are using the same MDCT quantization step size and quantization range) according to the MPEG standard. In particular, the frequency-band resolution for the prediction coefficient may be one that is psycho-acoustically justified, such as the Bark scale. A demultiplexer 201 is adapted to extract these MDCT representations and the prediction coefficient (part of Control information as indicated in the figure) from the bit stream that is supplied to it. Indeed, more control information than merely the complex prediction coefficient may be encoded in the bit stream, e.g., instructions whether the bit stream is to be decoded in prediction or non-prediction mode, TNS information, etc. TNS information may include values of the TNS parameters to be applied by the TNS (synthesis) filters of the decoder system. If identical sets of TNS parameters are to be used for several TNS filters, such as for both channels, it is economical receive this information in the form of a bit indicating such identity of the parameter sets rather than receiving the two sets of parameters independently. Information may also be included whether to apply TNS before or after the upmix stage, as appropriate based on, e.g., a psycho-acoustic evaluation of the two available options. Moreover, then control information may indicate individually limited bandwidths for the downmix and residual signals. For each channel, frequency bands above a bandwidth limit will not be decoded but will be set to zero. In certain cases, the highest frequency bands have so small energy content that they are already quantized down to zero. Normal practice (cf. the parameter max_sfb in the MPEG standard) has been to use the same bandwidth limitation for both the downmix and residual signals. However, the residual signal, to a greater extent than the downmix signal, has its energy content localized to lower frequency bands. Therefore, by placing a dedicated upper bandwidth limit on the residual signal, a bit-rate reduction is possible at no significant loss of quality. For instance, this may be governed by two independent max_sfb parameters encoded in the bit stream, one for the downmix signal and one for the residual signal.

In this embodiment, the MDCT representation of the stereo signal is segmented into successive time frames (or time blocks) comprising a fixed number of data points (e.g., 1024 points), one of several fixed numbers of data points (e.g., 128 or 1024 points) or a variable number of points. As is known to those skilled in the art, the MDCT is critically sampled. The output of the decoding system, indicated in the right part of the drawing, is a time-domain stereo signal having left L and right R channels. Dequantization modules 202 are adapted to handle the bit stream input to the decoding system or, where appropriate, two bit streams obtained after demultiplexing of an original bit stream and corresponding to each of the downmix and residual channels. The dequantized channel signals are provided to a switching assembly 203 operable either in a pass-through mode or a sum-and-difference mode corresponding to the respective transformation matrices $$\begin{bmatrix} 1 & 0 \\ 0 & 1 \end{bmatrix} \text{ and } \frac{1}{2}\begin{bmatrix} 1 & 1 \\ 1 & -1 \end{bmatrix}.$$

As will be further discussed in the next paragraph, the decoder system includes a second switching assembly 205. Both switching assemblies 203, 205, like most other switches and switching assemblies in this embodiment and the embodiments to be described, are operable in a frequency-selective fashion. This enables decoding of a large variety of decoding modes, e.g., decoding frequency-dependent L/R or M/S decoding, as known in the related art. Hence, the decoder according to the invention can be regarded as a superset in relation to the related art.

Assuming for now that the switching assembly 203 is in the pass-through mode, the dequantized channel signals are passed, in this embodiment, through respective TNS filters 204. The TNS filters 204 are not essential to the operation of the decoding system and may be replaced by pass-through elements. After this, the signal is supplied to the second switching assembly 205 having the same functionality as the switching assembly 203 located upstream. With inputs signals as previously described and with the second switching assembly 205 set in its pass-through mode is, the output of the former is the downmix channel signal and the residual channel signal. The downmix signal, still represented by its time-successive MDCT spectra, is supplied to a real-to-imaginary transform 206 adapted to compute, based thereon, MDST spectra of the downmix signal. In this embodiment, one MDST frame is based on three MDCT frames, one previous frame, one current (or contemporaneous) frame and one subsequent frame. It is indicated symbolically ($Z^{-1}$, Z) that the input side of the real-to-imaginary transform 206 comprises delay components.

The MDST representation of the downmix signal obtained from the real-to-imaginary transform 206 is weighted by the imaginary part $\alpha_I$ of the prediction coefficient and is added to the MDCT representation of the downmix signal weighted by the real part $\alpha_B$ of the prediction coefficient and the MDCT representation of the residual signal. The two additions and multiplications are performed by multipliers and adders 210, 211, together forming (functionally) a weighted adder, which are supplied with the value of the complex prediction coefficient $\alpha$ encoded in the bit stream initially received by the decoder system. The complex prediction coefficient may be determined once for every time frame. It may also be determined more often, such as once for every frequency band within a frame, the frequency bands being a psycho-acoustically motivated partition. It may also be determined less frequently, as will be discussed below in connection with encoding systems according to the invention. The real-to-imaginary transform 206 is synchronized with the weighted adder in such manner that a current MDST frame of the downmix channel signal is combined with one contemporaneous MDCT frames of each of the downmix channel signal and the residual channel signal. The sum of these three signals is a side signal S=Re{αM}+D. In this expression, M includes both the MDCT and MDST representations of the downmix signal, namely M=$M_{MDCT}$-i$M_{MDST}$, whereas D=$D_{MDCT}$ is real-valued. Thus, a stereo signal having a downmix channel and a side channel is obtained, from which a sum-and-difference transform 207 restores the left and right channels as follows:

$$\begin{cases} L = M + S \\ R = M - S \end{cases}$$

These signals are represented in the MDCT domain. The last step of the decoding system is to apply an inverse MDCT 209 to each of the channels, whereby a time-domain representation of the left/right stereo signal is obtained.

A possible implementation of the real-to-imaginary transform 206 is further described in applicant's U.S. Pat. No. 6,980,933 B2, as noted above. By formula 41 therein, the transform can be expressed as a finite impulse-response filter, e.g., for even points, $$S(2v) = \frac{2}{N} \sum_{p=0}^{N-1} [(-1)^{p+1} X_I(p) + X_{III}(p)] h_{I,III}(2v - p) + \frac{4}{N} \sum_{l=0}^{N-1} X_{II}(2l+1) h_{II}(2v - 2l - 1).$$

where S(2v) is the $2v^{th}$ MDST data point, $X_I$, $X_{II}$, $X_{III}$ are the MDCT data from each of the frames and N is the frame length. Further, $h_{I,III}$, $h_{II}$ are impulse responses depending on the window function applied, and are therefore determined for each choice of window function, such as rectangular, sinusoidal and Kaiser-Bessel-derived, and for each frame length. The complexity of this computation may be reduced by omitting those impulse responses which have a relatively smaller energy content and contribute relatively less to the MDST data. As an alternative or extension to this simplification, the impulse responses themselves may be shortened, e.g., from the full frame length to smaller number of points. As an example, the impulse response length may be decreased from 1024 points (taps) to 10 points. The most extreme truncation that can still be considered meaningful is S(v)=$X_{II}$(v+1)-$X_{II}$(v-1). Other straightforward approaches can be found in US 2005/0197831 A1.

Figure 10:
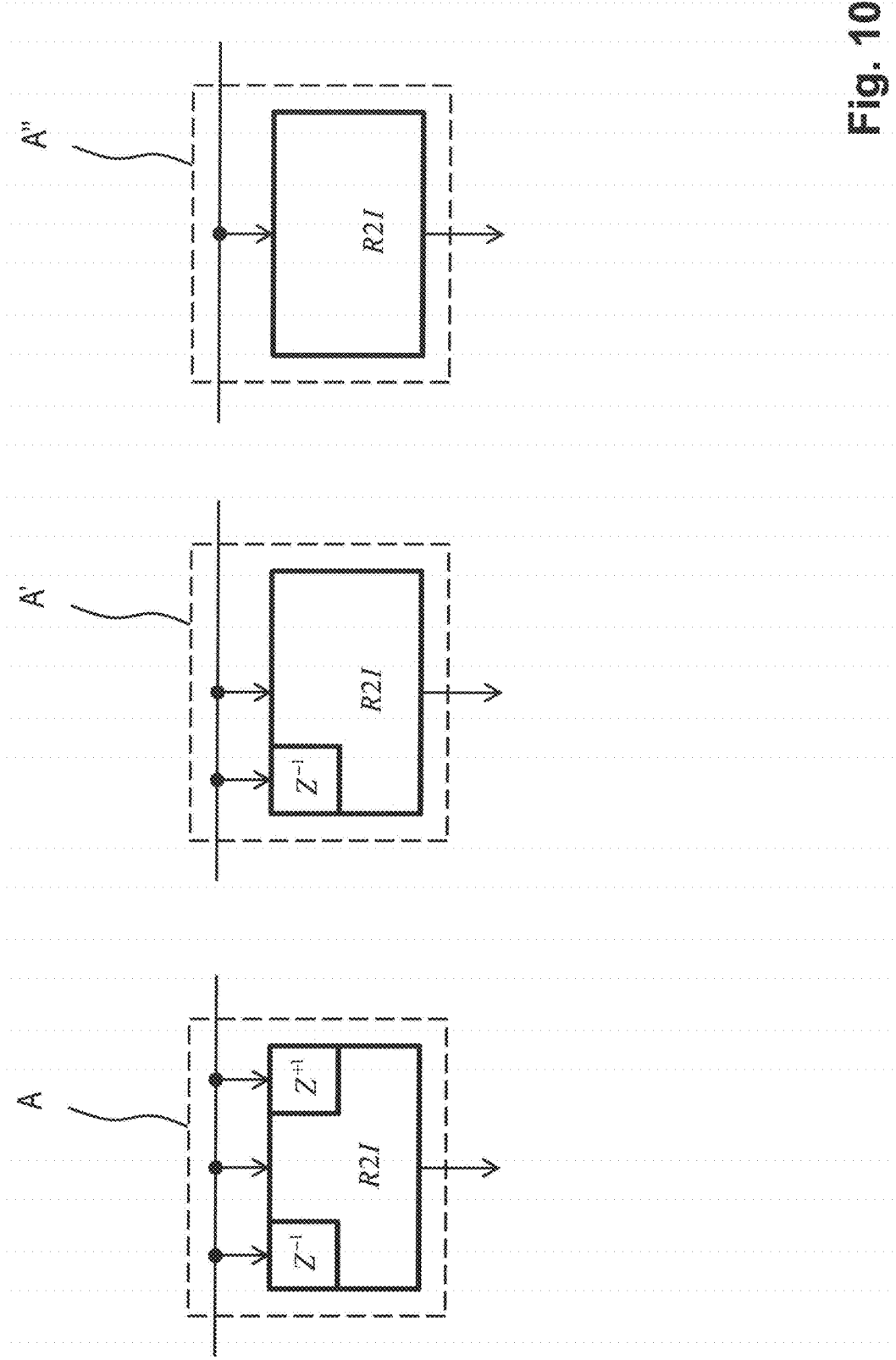
FIG. 10 shows alternative embodiments of the portion labeled A in FIGS. 2 and 8.

It is further possible to reduce the amount of input data on which the computation is based. To illustrate, the real-to-imaginary transform 206 and its upstream connections, which are indicated as a portion denoted by "A" on the drawing, be replaced by a simplified variant, two of which A' and A" are shown in FIG. 10. The variant A' provides an approximate imaginary representation of the signal. Here, the MDST computation only takes the current and the previous frame into account. With reference to the formula above in this paragraph, this may be effected by setting $X_{III}$(p)=0 for p=0, . . . , N-1 (index III denotes the subsequent time frame). Because the variant A' does not require MDCT spectrum of the subsequent frame as input, the MDST calculation does not incur any time delay. Clearly, this approximation somewhat reduces the accuracy of the MDST signal obtained, but may also imply that the energy of this signal becomes reduced; the latter fact can be fully compensated by an increase in $\alpha_I$ a result of the nature of prediction coding.

Also shown in FIG. 10 is the variant A", which uses as input only the MDCT data for the current time frame. Variant A" arguably produces a less accurate MDST representation than variant A'. On the other hand, it operates at zero delay, just like variant A', and has lower computational complexity. As already mentioned, the waveform coding properties are not affected as long as the same approximation is used in the encoder system and the decoder system.

It is to be noted, irrespective of whether variant A, A' or A" or any further development thereof is used, that only those portions of the MDST spectrum need to be computed for which the imaginary part of the complex prediction coefficient is non-zero, $\alpha_I \neq 0$. In practical circumstances this will be taken to mean that the absolute value |$\alpha_I$| of the imaginary part of the coefficient is greater than a predetermined threshold value, which may be related to the unit round-off of the hardware used. In case the imaginary part of the coefficient is zero for all frequency bands within a time frame, there is no need to compute any MDST data for that frame. Thus, suitably, the real-to-imaginary transform 206 is adapted to respond to occurrences of very small |$\alpha_I$| values by not generating MDST output, whereby computing resources can be economized. In embodiments where more frames than the current one are used to produce one frame of MDST data, however, any units upstream of the transform 206 should suitably continue operating even though no MDST spectrum is needed—in particular, the second switching assembly 205 should keep forwarding MDCT spectra—so that sufficient input data are already available to the real-to-imaginary transform 206 already when the next time frame associated with a non-zero prediction coefficient occurs; this may of course be the next time block.

Returning to FIG. 2, the function of the decoding system has been described under the assumption of both switching assemblies 203, 205 being set in their respective pass-through modes. As will be discussed now, the decoder system can as well decode signals that are not prediction coded. For this use, the second switching assembly 205 will be set in its sum-and-difference mode and suitably, as indicated on the drawing, a selector arrangement 208 will be set in its lower position, thereby ensuring that signals are fed directly to the inverse transform 209 from a source point between the TNS filters 204 and the second switching assembly 205. To ensure correct decoding, the signal suitably has L/R form at the source point. Therefore, to ensure that the real-to-imaginary transform is supplied with the correct mid (i.e., downmix) signal at all times (rather than, say, intermittently by a left signal), the second switching assembly 205 is preferably set in its sum-and-difference mode during decoding of a non-prediction-coded stereo signal. As noted above, prediction coding may be replaced by conventional direct or joint coding for certain frames based on, e.g., a data rate-to-audio quality decision. The outcome of such decision may be communicated from the encoder to the decoder in various ways, e.g., by the value of a dedicated indicator bit in each frame, or by the absence or presence of a value of the prediction coefficient. Having established these facts, the role of the first switching assembly 203 can be easily realized. Indeed, in non-prediction coding mode, the decoder system can process both signals according to direct (L/R) stereo coding or joint (M/S) coding, and by operating the first switching assembly 203 either in pass-through or sum-and-difference mode, it is possible to ensure that the source point is always provided with a directly coded signal. Clearly, the switching assembly 203 when functioning as sum-and-difference stage will convert an input signal in M/S form into an output signal (supplied to the optional TNS filters 204) in L/R form.

The decoder system receives a signal whether a particular time frame is to be decoded by the decoder system in prediction-coding or non-prediction-coding mode. Non-prediction mode may be signaled by the value of a dedicated indicator bit in each frame or by the absence (or the value zero) of the prediction coefficient. Prediction mode may be communicated analogously. A particularly advantageous implementation, which enables fallback without any overhead, makes use of a reserved fourth value of the two-bit field ms_mask_present (see MPEG-2 AAC, document ISO/IEC 13818-7), which is transmitted per time frame and defined as follows:

TABLE 1

Definition of ms_mask_present in USAC

| Value | Meaning |
|---|---|
| 00 | L/R coding for all frequency bands |
| 01 | one signaling bit per band is used to indicate L/R or M/S |
| 10 | M/S coding for all frequency bands |
| 11 | reserved |

By redefining the value 11 to mean "complex prediction coding", the decoder can be operated in all legacy modes, particularly M/S and L/R coding, without any bit-rate penalty and is yet able to receive a signal indicating complex prediction coding mode for the relevant frames.

Figure 4:
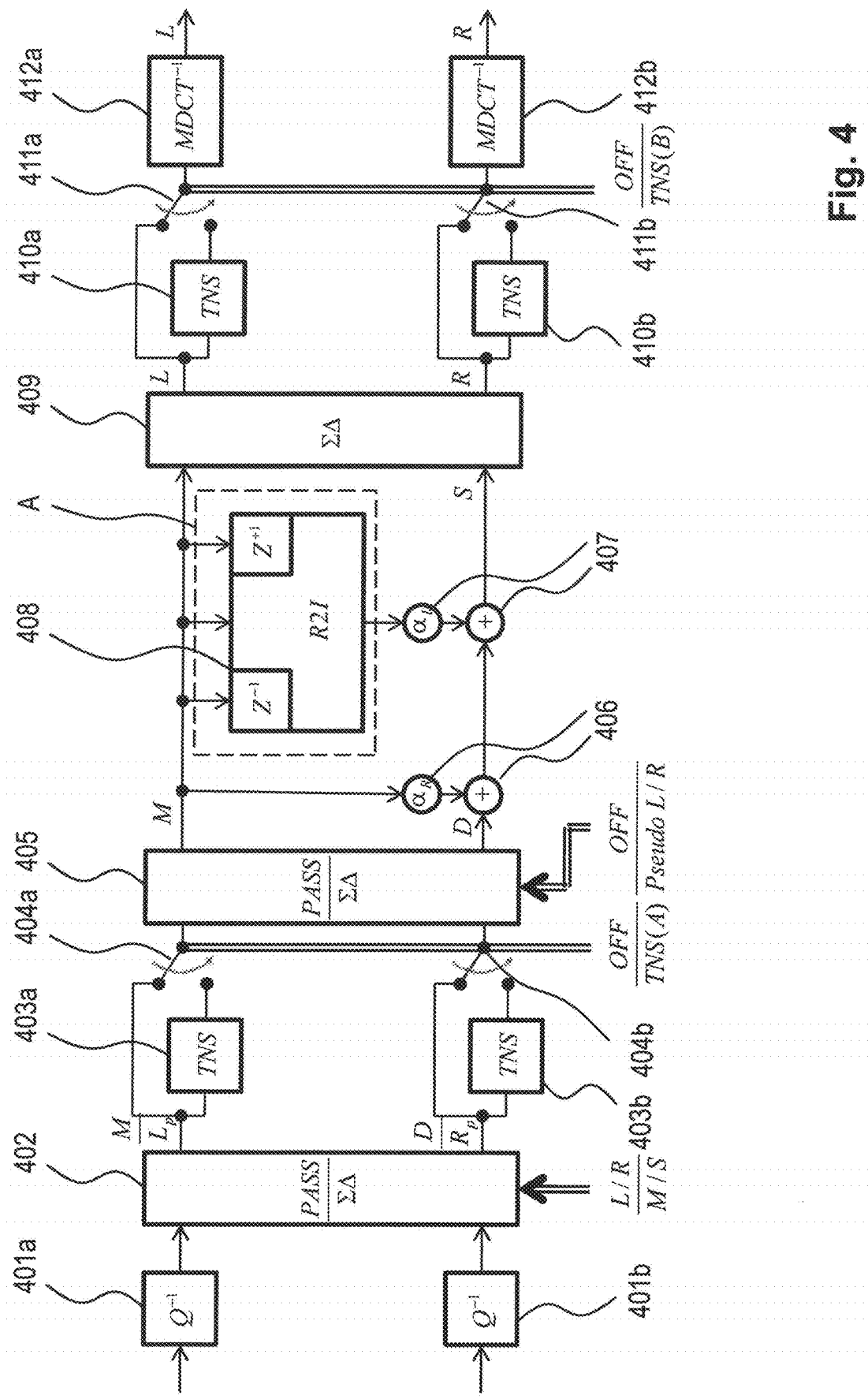
FIG. 4 shows an alternative embodiment of the decoder system of FIG. 2, in which the location of the active TNS stage is selectable.

FIG. 4 shows a decoder system of the same general structure as the one shown in FIG. 2 but including, however, at least two different structures. Firstly, the system of FIG. 4 includes switches 404, 411 enabling the application of some processing step involving frequency-domain modification upstream and/or downstream of the upmix stage. This is achieved, on the one hand, by a first set of frequency-domain modifiers 403 (drawn as TNS synthesis filters in this figure) provided together with the first switch 404 downstream of dequantization modules 401 and a first switching assembly 402 but upstream of a second switching assembly 405 arranged immediately upstream of the upmix stage 406, 407, 408, 409. On the other hand, the decoder system includes a second set of frequency-domain modifiers 410 provided together with a second switch 411 downstream of the upmix stage 406, 407, 408, 409 but upstream of an inverse transform stage 412. Advantageously, as indicated on the drawing, each frequency-domain modifier is arranged in parallel with a pass-through line which is connected upstream to the input side of the frequency-domain modifier and is connected downstream to the associated switch. By virtue of this structure, the frequency-domain modifier is supplied with the signal data at all times, enabling processing in the frequency domain based on more time frames than the current one only. The decision whether to apply the first 403 or second sets of frequency-domain modifiers 410 may be taken by the encoder (and conveyed in the bit stream), or may be based on whether prediction coding is applied, or may be based on some other criterion found suitable in practical circumstances. As an example, if the frequency-domain modifier are TNS filters, then the first set 403 may be advantageous to use for some kinds of signals, while the second set 410 may be advantageous for other kinds of signals. If the outcome of this selection is encoded in the bit stream, then the decoder system will activate the respective set of TNS filters accordingly.

To facilitate understanding of the decoder system shown in FIG. 4, it is explicitly noted that decoding of a directly (L/R) coded signal takes place when $\alpha=0$ (implying that pseudo-L/R and L/R are identical and that the side and residual channels do not differ), the first switching assembly 402 is in the pass mode, the second switching assembly is in the sum-and-difference mode, thereby causing the signal to have M/S form between the second switching assembly 405 and a sum-and-difference stage 409 of the upmix stage. Because the upmix stage will then effectively be a pass-through step, it is immaterial whether (using the respective switches 404, 411) the first or second set frequency-domain modifiers is activated.

Figure 3:
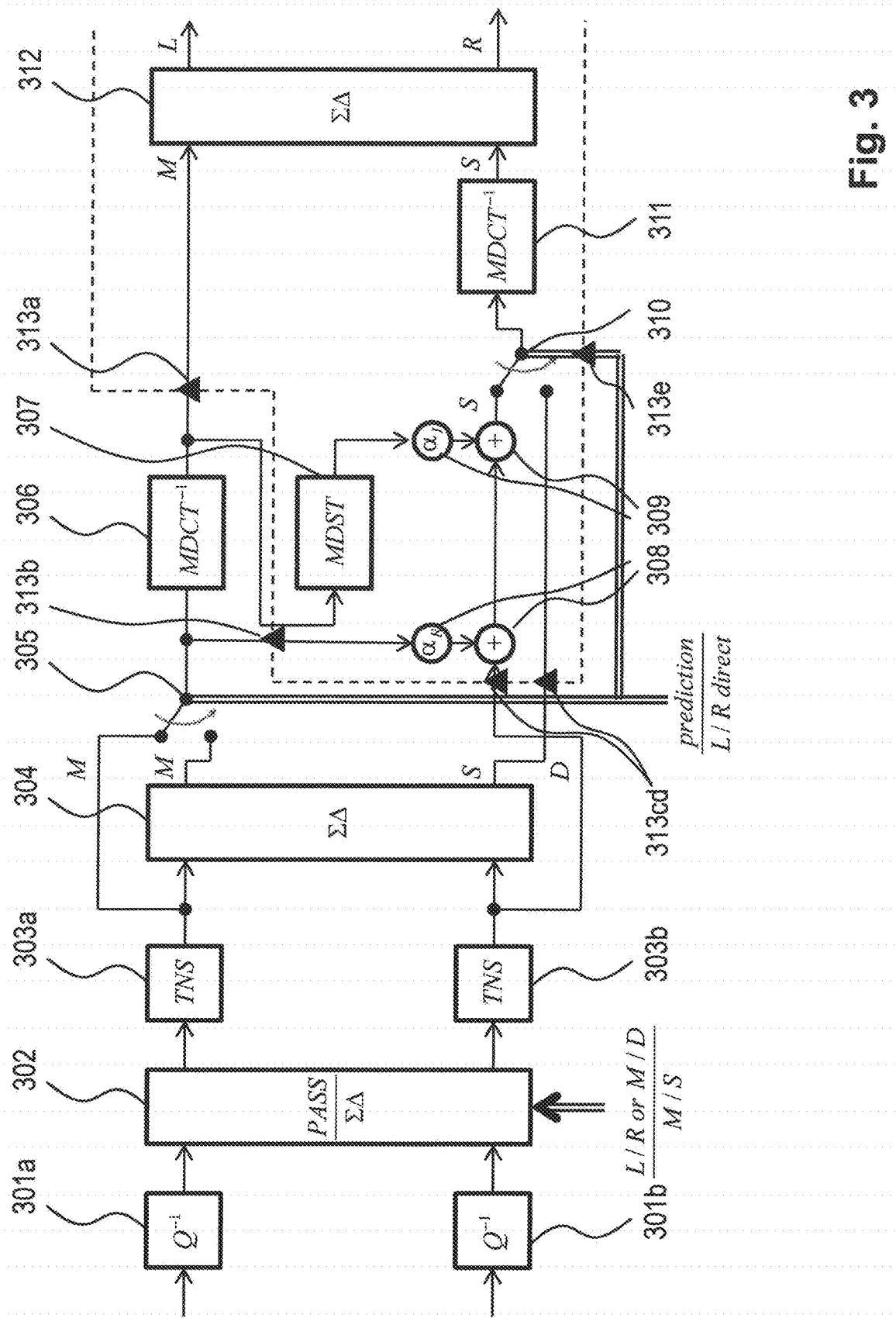
FIG. 3 is a generalized block diagram of an MDCT-based stereo decoder system with complex prediction, according to an embodiment of the present invention, in which the complex representation of a channel of the signal to be decoded is computed in the time domain.

FIG. 3 illustrates a decoder system according to an embodiment of the invention which, in relation to those of FIGS. 2 and 4, represents a different approach to the provision of MDST data required for the upmixing. Like the decoder systems already described, the system of FIG. 3 comprises dequantization modules 301, a first switching assembly 302 operable in either a pass-through or sum-and-difference mode and TNS (synthesis) filters 303, which are all serially arranged from the input end of the decoder system. Modules downstream of this point are selectively utilized by means of two second switches 305, 310, which are preferably operated jointly so that both are either in their upper positions or lower positions, as indicated in the figure. At the output end of the decoder system, there are a sum-and-difference stage 312 and, immediately upstream thereof, two inverse MDCT modules 306, 311 for transforming an MDCT-domain representation of each channel into a time-domain representation.

In complex prediction decoding, wherein the decoder system is supplied with a bit stream encoding a downmix/residual stereo signal and values of a complex prediction coefficient, the first switching assembly 302 is set in its pass-through mode and the second switches 305, 310 are set in the upper position. Downstream of the TNS filters, the two channels of the (dequantized, TNS-filtered, MDCT) stereo signal are processed in different ways. The downmix channel is provided, on the one hand, to a multiplier and summer 308, which adds the MDCT representation of the downmix channel weighted by the real part of the prediction coefficient to the MDCT representation of the residual channel, and, on the other hand, to one 306 of the inverse MDCT transform modules. The time-domain representation of the downmix channel M, which is output from the inverse MDCT transform module 306, is supplied both to the final sum-and-difference stage 312 and to an MDST transform module 307. This double use of the time-domain representation of the downmix channel is advantageous from the point of view of computational complexity. The MDST representation of the downmix channel thus obtained is supplied to a further multiplier and summer 309, which after weighting by the imaginary part of the prediction coefficient adds this signal to the linear combination output from the summer 308; hence, the output of the summer 309 is a side channel signal, $S=\text{Re}\{\alpha M\}+D$. Similarly to the decoder system shown in FIG. 2, the multipliers and summers 308, 309 may readily be combined to form a weighted multi-signal summer with inputs the MDCT and MDST representations of the downmix signal, the MDCT representation of the residual signal and the value of the complex prediction coefficient. Downstream of this point in the present embodiment, only a passage through the inverse MDCT transform module 311 remains before the side channel signal is supplied to the final sum-and-difference stage 312.

The necessary synchronicity in the decoder system may be achieved by applying the same transform lengths and window shapes at both inverse MDCT transform modules 306, 311, as is already the practice in frequency-selective M/S and L/R coding. A one-frame delay is introduced by the combination of certain embodiments of the inverse MDCT module 306 and embodiments of the MDST module 307. Therefore, five optional delay blocks 313 (or software instructions to this effect in a computer implementation) are provided, so that the portion of the system located to the right of the dashed line can be delayed by one frame in relation to the left portion when necessary. Apparently, all intersections between the dashed line and connection lines are provided with delay blocks, with the exception of the connection line between the inverse MDCT module 306 and the MDST transform module 307, which is where the delay arises that requires compensation.

The computation of MDST data for one time frame requires data from one frame of the time-domain representation. However, the inverse MDCT transform is based on one (current), two (preferably: previous and current) or three (preferably: previous, current and subsequent) consecutive frames. By virtue of the well-known time-domain alias cancellation (TDAC) associated with the MDCT, the three-frame option achieves complete overlap of the input frames and thus provides the best (and possibly perfect) accuracy, at least in frames containing time-domain alias. Clearly, the three-frame inverse MDCT operates at a one-frame delay. By accepting to use an approximate time-domain representation as input to the MDST transform, one may avoid this delay and thereby the need to compensate delays between different portions of the decoder system. In the two-frame option, the overlap/add enabling TDAC occurs in the earlier half of the frame, and alias may be present only in the later half. In the one-frame option, the absence of TDAC implies that alias may occur throughout the frame; however, an MDST representation achieved in this manner, and used as an intermediate signal in complex prediction coding, may still provide a satisfactory quality.

The decoding system illustrated in FIG. 3 may also be operated in two non-prediction decoding modes. For decoding a directly L/R coded stereo signal, the second switches 305, 310 are set in the lower position and the first switching assembly 302 is set in the pass-through mode. Thus, the signal has L/R form upstream of the sum-and-difference stage 304, which converts it into M/S form, upon which inverse MDCT transformation and a final sum-and-difference operation take place. For decoding a stereo signal provided in jointly M/S coded form, the first switching assembly 302 is instead set in its sum-and-difference mode, so that the signal has L/R form between the first switching assembly 302 and the sum-and-difference stage 304, which is often more suitable from the point of view of TNS filtering than an M/S form would be. The processing downstream of the sum-and-difference stage 304 is identical to that in the case of direct L/R decoding.

Figure 14:
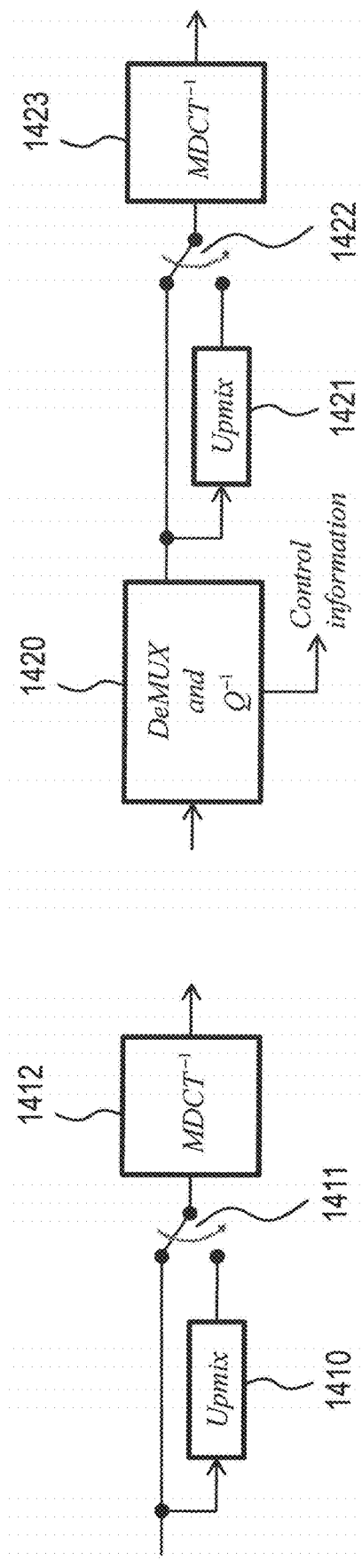
FIG. 14A is a generalized block diagram showing an embodiment of a decoder system according to an embodiment of the invention.
FIG. 14B is a generalized block diagram showing an embodiment of a decoder system according to an embodiment of the invention.
FIG. 14C is a generalized block diagram showing an embodiment of a decoder system according to an embodiment of the invention.

FIG. 14 consists of three generalized block diagrams of decoders according to embodiments of the invention. In contrast to several other block diagrams accompanying this application, a connection line in FIG. 14 may symbolize a multi-channel signal. In particular, such connection line may be arranged to transmit a stereo signal comprising left/right, mid/side, downmix/residual, pseudo-left/pseudo-right channels and other combinations.

FIG. 14A shows a decoder system for decoding a frequency-domain representation (indicated, for the purpose of this figure, as an MDCT representation) of an input signal. The decoder system is adapted to supply as its output a time-domain representation of a stereo signal, which is generated on the basis of the input signal. To be able to decode an input signal coded by complex prediction stereo coding, the decoder system is provided with an upmix stage 1410. However, it is also capable of handling an input signal encoded in other formats and possibly, that alternates between several coding formats over time, e.g., a sequence of time frames coded by complex prediction coding may be followed by a time portion coded by direct left/right coding. The decoder system's ability to handle different coding formats is achieved by the provision of a connection line (pass-through) arranged in parallel with said upmix stage 1410. By means of a switch 1411 it is possible to select whether the output from the upmix stage 1410 (lower switch position in figure) or the non-processed signal available over the connection line (upper switch position in figure) is to be supplied to the decoder modules arranged further downstream. In this embodiment, an inverse MDCT module 1412 is arranged downstream of the switch, which transforms an MDCT representation of a signal into a time-domain representation. As an example, the signal supplied to the upmix stage 1410 may be a stereo signal in downmix/residual form. The upmix stage 1410 then is adapted to derive a side signal and to perform a sum-and-difference operation so that a left/right stereo signal (in the MDCT domain) is output.

FIG. 14B shows a decoder system similar to that of FIG. 14A. The present system is adapted to receive a bit stream at its input signal. The bit stream is initially processed by a combined demultiplexer and dequantization module 1420, which provides, as a first output signal, an MDCT representation of a multi-channel stereo signal for further treatment, as determined by the position of a switch 1422 having analogous functionality as the switch 1411 of FIG. 14A. More precisely, the switch 1422 determines whether the first output from the demultiplexer and dequantization is to be processed by an upmix stage 1421 and an inverse MDCT module 1423 (lower position) or by the inverse MDCT module 1423 only (upper position). The combined demultiplexer and dequantization module 1420 outputs control information as well. In the present case, the control information associated with the stereo signal may include data indicating whether the upper or lower position of the switch 1422 is suitable for decoding the signal or, more abstractly, according to what coding format the stereo signal is to be decoded. The control information may also include parameters for adjusting the properties of the upmix stage 1421, e.g., a value of the complex prediction coefficient α used in complex prediction coding as already described above.

FIG. 14C shows a decoder system which, in addition to the entities analogous to those in FIG. 14B, comprises first and second frequency-domain modifying devices 1431, 1435 respectively arranged upstream and downstream of an upmix stage 1433. For the purposes of this figure, each frequency-domain modifying device is illustrated by a TNS filter. However, by the term frequency-domain modifying device could also be understood other processes than TNS filtering that are susceptible of being applied either before or after the upmix stage. Examples of frequency-domain modifications include prediction, noise addition, bandwidth extension, and non-linear processing. Psychoacoustic considerations and similar reasons, which possibly include the properties of the signal to be processed and/or the configuration or settings of such a frequency-domain modifying device, sometimes indicate that it is advantageous to apply said frequency-domain modification upstream of the upmix stage 1433 rather than downstream. In other cases, it may be established by similar considerations that the downstream position of the frequency-domain modification is preferable to the upstream one. By means of switches 1432, 1436, the frequency-domain modifying devices 1431, 1435 may be selectively activated so that, responsive to control information, the decoder system can select the desired configuration. As an example, FIG. 14C shows an configuration in which the stereo signal from the combined demultiplexer and dequantization module 1430 is initially processed by the first frequency-domain modifying device 1431, is then supplied to the upmix stage 1433 and is finally forwarded directly an inverse MDCT module 1437, without passing through the second frequency-domain modifying device 1435. As explained in section Summary, this configuration is preferred over the option of performing TNS after upmixing in complex prediction coding.

II. Encoder Systems

Figure 5:
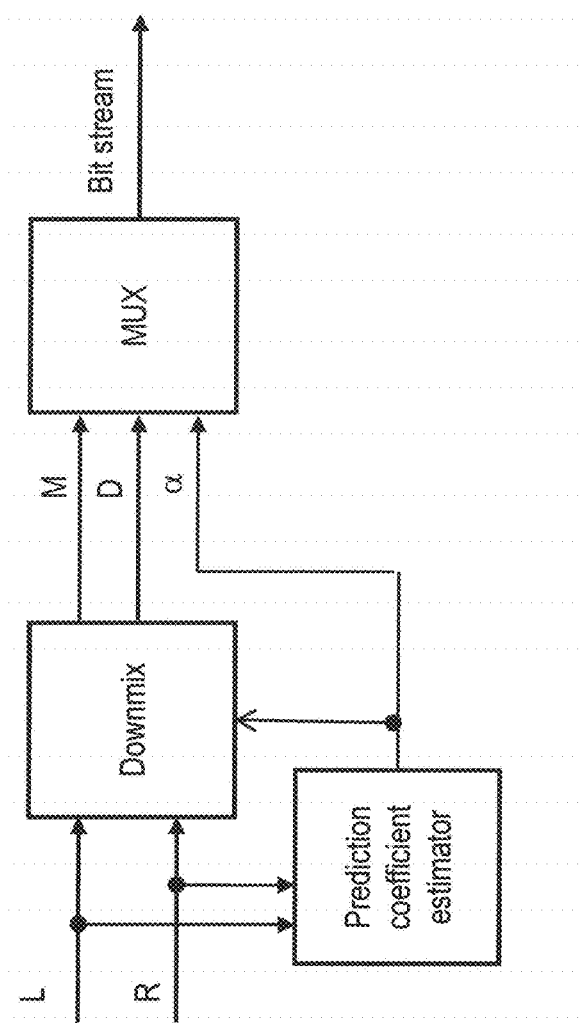
FIG. 5 comprises generalized block diagrams showing MDCT-based stereo encoder systems with complex prediction, according to embodiments of another aspect of the present invention.

An encoder system according to the invention will now be described with reference to FIG. 5, which is a generalized block diagram of an encoder system for encoding a left/right (L/R) stereo signal as an output bit stream by complex prediction coding. The encoder system receives a time-domain or frequency-domain representation of the signal and supplies this to both a downmix stage and a prediction coefficient estimator. The real and imaginary parts of the prediction coefficients are provided to the downmix stage in order to govern the conversion of the left and right channels into downmix and residual channels, which are then supplied to a final multiplexer MUX. If the signal was not supplied as a frequency-domain representation to the encoder, it is transformed into such representation in the downmix stage or multiplexer.

One of the principles in prediction coding is to convert the left/right signal to mid/side form, that is, $$\begin{cases} M = \dfrac{L+R}{2} \\ S = \dfrac{L-R}{2} \end{cases}$$

and then to make use of the remaining correlation between these channels, namely by setting $S = Re\{\alpha M\} + D,$ where $\alpha$ is the complex prediction coefficient to be determined and D is the residual signal. It is possible to choose $\alpha$ in order that the energy of the residual signal $D = S - Re\{\alpha M\}$ is minimized. Energy minimization may be effected with respect to the momentary power, a shorter- or longer-term energy (power average), which in the case of a discrete signal amounts to optimization in the mean-square sense.

The real and imaginary parts $\alpha_R, \alpha_I$ of the prediction coefficient may be quantized and/or coded jointly. Preferably however, the real and imaginary parts are quantized independently and uniformly, typically with a step size of 0.1 (dimensionless number). The frequency-band resolution used for the complex prediction coefficient is not necessarily the same as the resolution for scale factors bands (sfb; i.e., a group of MDCT lines that are using the same MDCT quantization step size and quantization range) according to the MPEG standard. In particular, the frequency-band resolution for the prediction coefficient may be one that is psycho-acoustically justified, such as the Bark scale. It is noted that the frequency-band resolution may vary in cases the transform length varies.

As noted already, the encoder system according to the invention may have a latitude whether to apply prediction stereo coding or not, the latter case implying a fallback to L/R or M/S coding. Such decision may be taken on a time-frame basis or finer, on a frequency-band basis within a time frame. As noted above, a negative outcome of the decision may be communicated to the decoding entity in various ways, e.g., by the value of a dedicated indicator bit in each frame, or by the absence (or zero value) of a value of the prediction coefficient. A positive decision may be communicated analogously. A particularly advantageous implementation, which enables fallback without any overhead, makes use of a reserved fourth value of the two-bit field ms_mask_present (see MPEG-2 AAC, document ISO/IEC 131818-7), which is transmitted per time frame and defined as follows:

TABLE 1

Definition of ms_mask_present in USAC

| Value | Meaning |
|---|---|
| 00 | L/R coding for all frequency bands |
| 01 | one signaling bit per band is used to indicate L/R or M/S |
| 10 | M/S coding for all frequency bands |
| 11 | reserved |

By redefining the value 11 to mean "complex prediction coding", the encoder can be operated in all legacy modes, particularly M/S and L/R coding, without any bit-rate penalty and is yet able to signal complex prediction coding for those frames where it is advantageous.

The substantive decision may be based on a data rate-to-audio quality rationale. As a quality measure, data obtained using a psychoacoustic model included in the encoder (as is often the case of available MDCT-based audio encoders) may be used. In particular, some embodiments of the encoder provides a rate-distortion optimized selection of the prediction coefficient. Accordingly, in such embodiments, the imaginary part—and possibly the real part too—of the prediction coefficient is set to zero if the increase in prediction gain does not economize enough bits for the coding of the residual signal to justify spending the bits required for coding the prediction coefficient.

Embodiments of the encoder may encode information relating to TNS in the bit stream. Such information may include values of the TNS parameters to be applied by the TNS (synthesis) filters on the decoder side. If identical sets of TNS parameters are to be used for both channels, it is economical to include a signaling bit indicating this identity of the parameter sets rather than to transmit the two sets of parameters independently. Information may also be included whether to apply TNS before or after the upmix stage, as appropriate based on, e.g., a psychoacoustic evaluation of the two available options.

As yet another optional feature, which is potentially beneficial from a complexity and bit-rate point of view, the encoder may be adapted to use an individually limited bandwidth for the encoding of the residual signal. Frequency bands above this limit will not be transmitted to the decoder but will be set to zero. In certain cases, the highest frequency bands have so small energy content that they are already quantized down to zero. Normal practice (cf. the parameter max_sfb in the MPEG standard) has entailed using the same bandwidth limitation for both the downmix and residual signals. Now, the inventors have found empirically that the residual signal, to a greater extent than the downmix signal, has its energy content localized to lower frequency bands. Therefore, by placing a dedicated upper band-with limit on the residual signal, a bit-rate reduction is possible at no significant loss of quality. For instance, this may be achieved by transmitting two independent max_sfb parameters, one for the downmix signal and one for the residual signal.

It is pointed out that although the issues of optimal determination of the prediction coefficient, quantization and coding thereof, fallback to the M/S or L/R mode, TNS filtering and upper bandwidth limitation etc. were discussed with reference to the decoder system shown in FIG. 5, the same facts are equally applicable to the embodiments that will be disclosed in what follows with reference to the subsequent figures.

Figure 6:
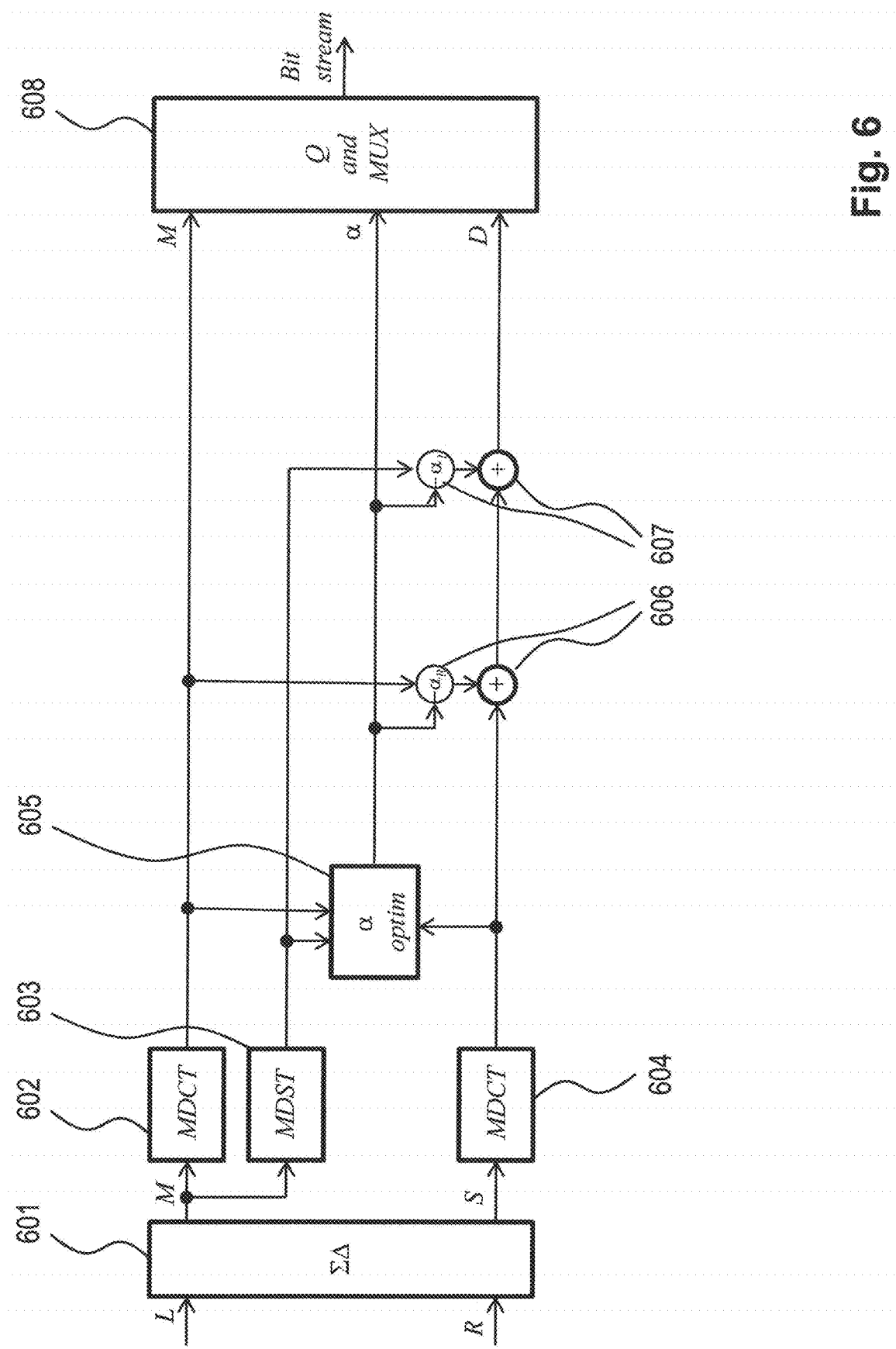
FIG. 6 is a generalized block diagram of an MDCT-based stereo encoder with complex prediction, according to an embodiment of the invention, in which a complex representation of a channel of the signal to be encoded is computed on the basis of the time-domain representation thereof.

FIG. 6 shows another encoder system according to the invention adapted to perform complex prediction stereo coding. The system receives as input a time-domain representation of a stereo signal segmented into successive, possibly overlapping, time frames and comprising left and right channels. A sum-and-difference stage 601 converts the signal into mid and side channels. The mid channel is supplied to both an MDCT module 602 and an MDST module 603, while the side channel is supplied to an MDCT module 604 only. A prediction coefficient estimator 605 estimates for each time frame—and possibly for individual frequency bands within a frame—a value of the complex prediction coefficient α as explained above. The value of the coefficient α is supplied as weight to weighted summers 606, 607, which form a residual signal D as a linear combination of the MDCT and MDST representations of the mid signal and the MDCT representation of the side signal. Preferably, the complex prediction coefficient is supplied to the weighted summers 606, 607 represented by the same quantization scheme which will be used when it is encoded into the bit stream; this obviously provides more faithful reconstruction, as both encoder and decoder applies the same value of the prediction coefficient. The residual signal, the mid signal (which may be more appropriately called downmix signal when it appears in combination with a residual signal) and the prediction coefficient are supplied to a combined quantization and multiplexer stage 608, which encodes these and possible additional information as an output bit stream.

Figure 7:
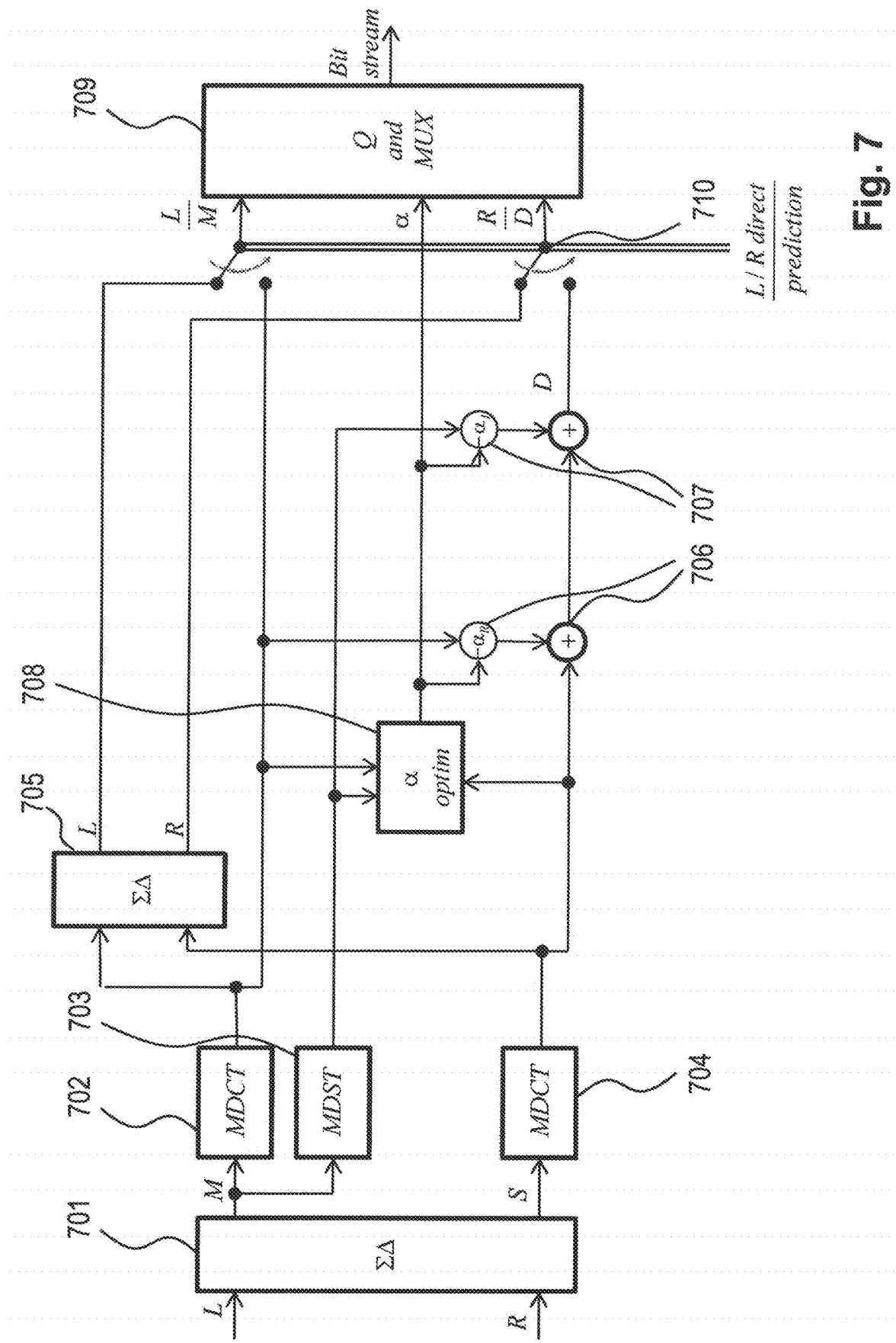
FIG. 7 shows an alternative embodiment of the encoder system of FIG. 6, which is operable also in a direct L/R coding mode.

FIG. 7 shows a variation to the encoder system of FIG. 6. As is clear from the similarity of symbols in the figure, it has as similar structure but also the added functionality of operating in a direct L/R coding fallback mode. The encoder system is actuated between the complex prediction coding mode and the fallback mode by means of a switch 710 provided immediately upstream of the combined quantization and multiplexer stage 709. In its upper position, as shown in the figure, the switch 710 will cause the encoder to operate in the fallback mode. From points immediately downstream of the MDCT modules 702, 704, the mid/side signal is supplied to a sum-and-difference stage 705, which after converting it into left/right form passes it on to the switch 710, which connects it to the combined quantization and multiplexer stage 709.

Figure 8:
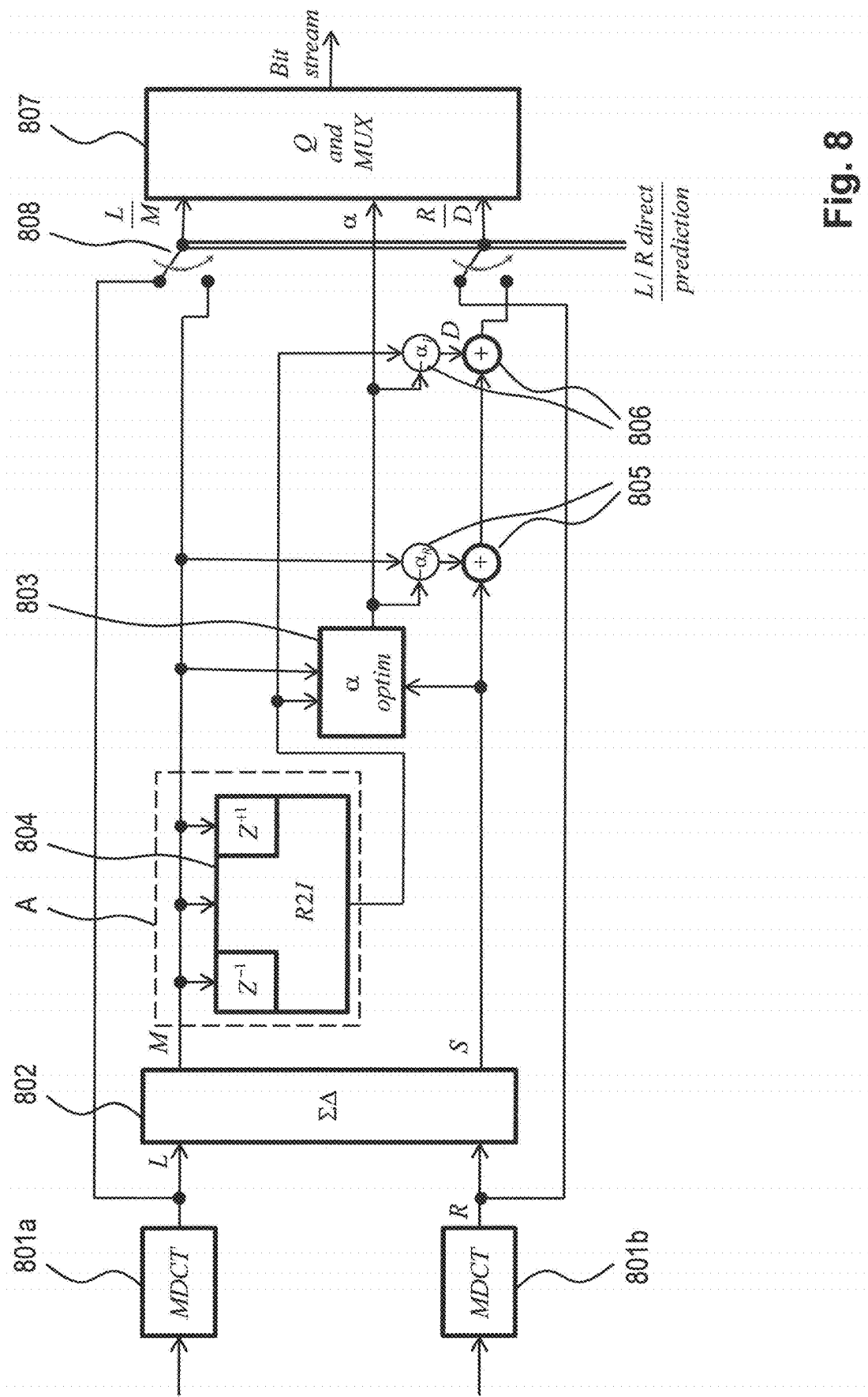
FIG. 8 is a generalized block diagram of an MDCT-based stereo encoder system with complex prediction, according to an embodiment of the invention, in which a complex representation of a channel of the signal to be encoded is computed on the basis of a first frequency-domain representation thereof, which decoder system is operable also in a direct L/R coding mode.

FIG. 8 shows an encoder system according to the present invention. In contrast to the encoder systems of FIGS. 6 and 7, this embodiment derives the MDST data required for the complex prediction coding directly from the MDCT data, that is, by a real-to-imaginary transform in the frequency domain. The real-to-imaginary transform applies any of the approaches discussed in connection with the decoder systems of FIGS. 2 and 4. It is important to match the computation method of the decoder with that of the encoder, so that faithful decoding can be achieved; preferably, identical real-to-imaginary transform methods are used on the encoder side and the decoder side. As for the decoder embodiments, the portion A enclosed by a dashed line and comprising the real-to-imaginary transform 804 can be replaced by approximate variants or using fewer input time frames as input. Likewise, the coding may be simplified using any one of the other approximation approaches described above.

On a higher level, the encoder system of FIG. 8 has a structure differing from that which would probably follow by a straightforward action of replacing the MDST module in FIG. 7 by a (suitably connected) real-to-imaginary module. The present architecture is clean and achieves the functionality of switching between prediction coding and direct L/R coding in a robust and computationally economical manner. The input stereo signal is fed to MDCT transform modules 801, which output a frequency-domain representation of each channel. This is fed both to a final switch 808 for actuating the encoder system between its prediction and direct coding modes and to a sum-and-difference stage 802. In direct L/R coding or joint M/S coding—which is carried out in time frame for which the prediction coefficient α is set to zero—this embodiment subjects the input signal to MDCT transformation, quantization and multiplexing only, the latter two steps being effected by a combined quantization and multiplexer stage 807 arranged at the output end of the system, where a bit stream is supplied. In prediction coding, each of the channels undergoes further processing between the sum-and-difference stage 802 and the switch 808. From the MDCT representation of the mid signal, the real-to-imaginary transform 804 derives MDST data and forwards these to both a prediction coefficient estimator 803 and a weighted summer 806. Like in the encoder systems shown in FIGS. 6 and 7, a further weighted summer 805 is used to combine the side signal with weighted MDCT and MDST representations of the mid signal to form a residual channel signal, which is encoded together with the mid (i.e., downmix) channel signal and the prediction coefficient by the combined quantization and multiplexer module 807.

Figure 9:
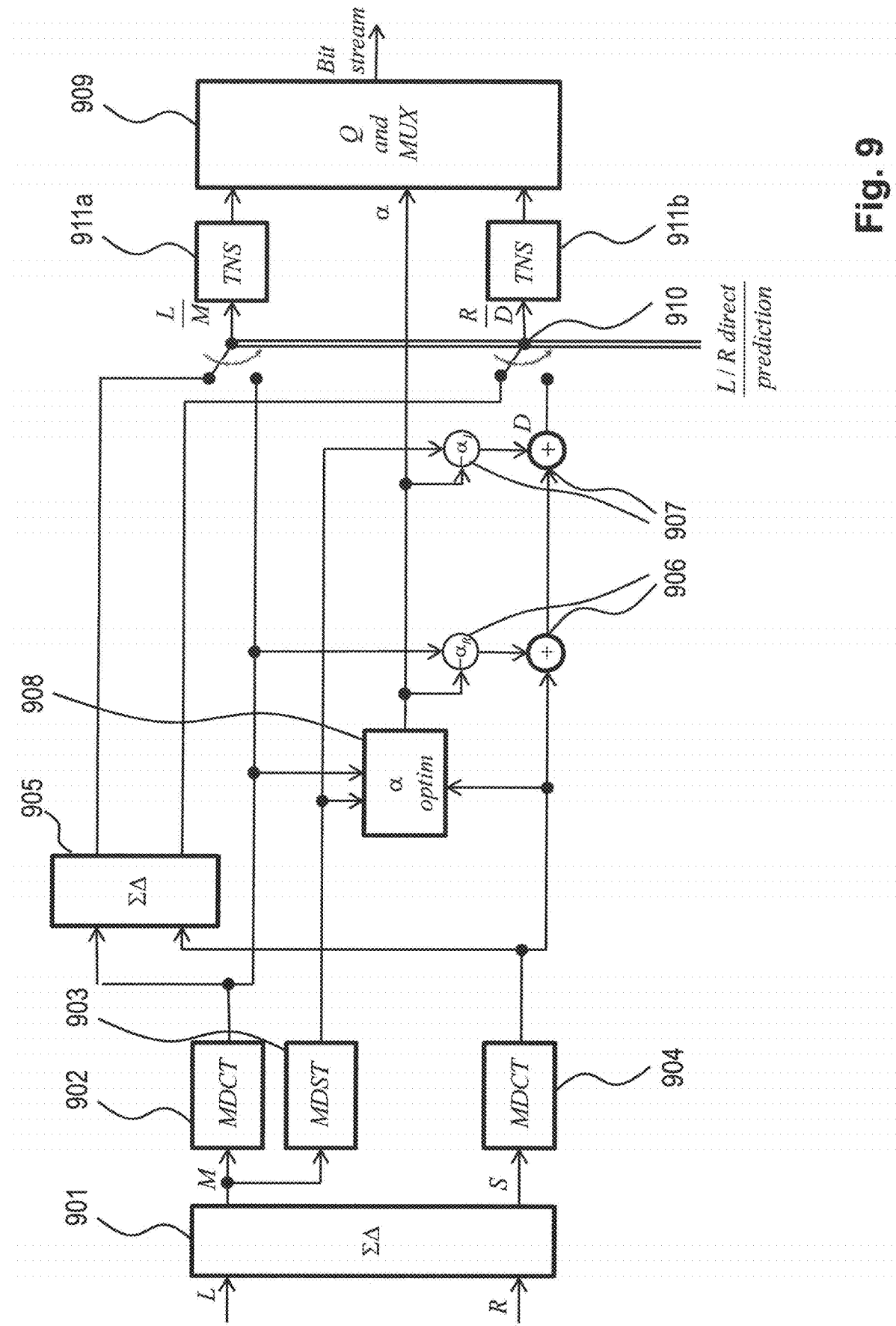
FIG. 9 shows an alternative embodiment of the encoder system of FIG. 7, which further includes a TNS stage arranged downstream of the coding stage.

Turning now to FIG. 9, it will be illustrated that each of the embodiments of the encoder system may be combined with one or more TNS (analysis) filters. In accordance with the previous discussions, it is often advantageous to apply TNS filtering to the signal in its downmixed form. Hence, as shown in FIG. 9, the adaptation of the encoder system of FIG. 7 to include TNS is effected by adding TNS filters 911 immediately upstream of the combined quantization and multiplexer module 909.

Instead of the right/residual TNS filter 911b, two separate TNS filters (not shown) may be provided immediately upstream of the portion of the switch 910 adapted to handle the right or residual channel. Thus, each of the two TNS filters will be supplied with the respective channel signal data at all times, enabling TNS filtering based on more time frames than the current one only. As has been already noted, TNS filters are but one example of frequency-domain modifying devices, notably devices basing their processing on more frame than the current one, which may benefit from such a placement as much as or more than at TNS filter does.

As another possible alternative to the embodiment shown in FIG. 9, TNS filters for selective activation can be arranged at more than one point for each channel. This is similar to the structure of the decoder system shown in FIG. 4, where different sets of TNS filters can be connected by means of switches. This allows selection of the most suitable available stage for TNS filtering for each time frame. In particular, it may be advantageous to switch between different TNS locations in connection with switching between complex prediction stereo coding and other coding modes.

Figure 11:
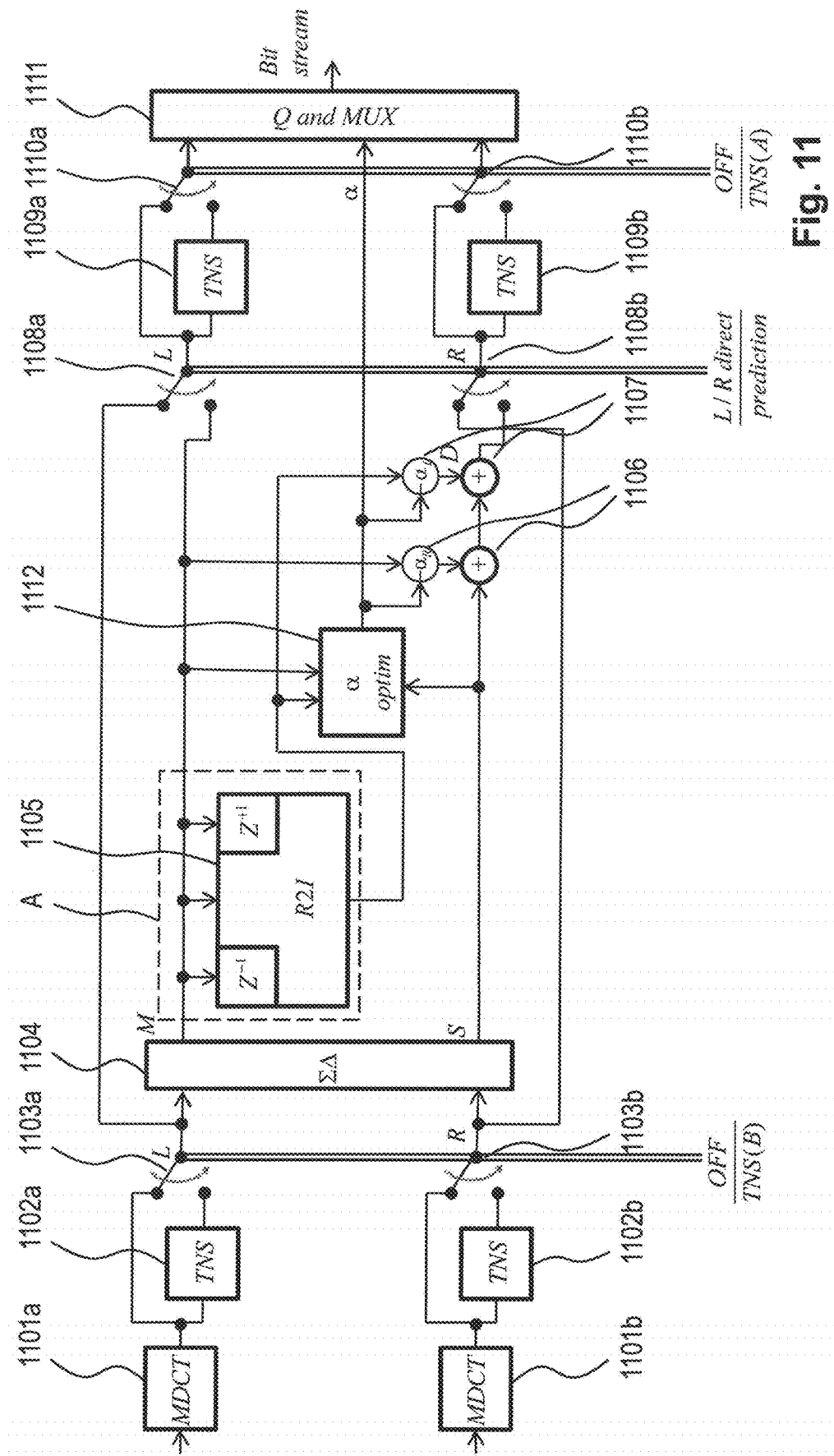
FIG. 11 is shows an alternative embodiment of the encoder system of FIG. 8, which further includes two frequency-domain modifying devices respectively arranged downstream and upstream of the coding stage.

FIG. 11 shows a variation based on the encoder system of FIG. 8, in which a second frequency-domain representation of the downmix signal is derived by means of a real-to-imaginary transform 1105. Similarly to the decoder system shown in FIG. 4, this encoder system also includes selectively activable frequency-domain modifier modules, one 1102 provided upstream of the downmix stage and one 1109 provided downstream thereof. The frequency-domain modules 1102, 1109, which have in this figure been exemplified by TNS filters, can be connected into each of the signal paths using the four switches 1103a, 1103b, 1109a and 1109b.

III. Non-Apparatus Embodiments

Figure 15:
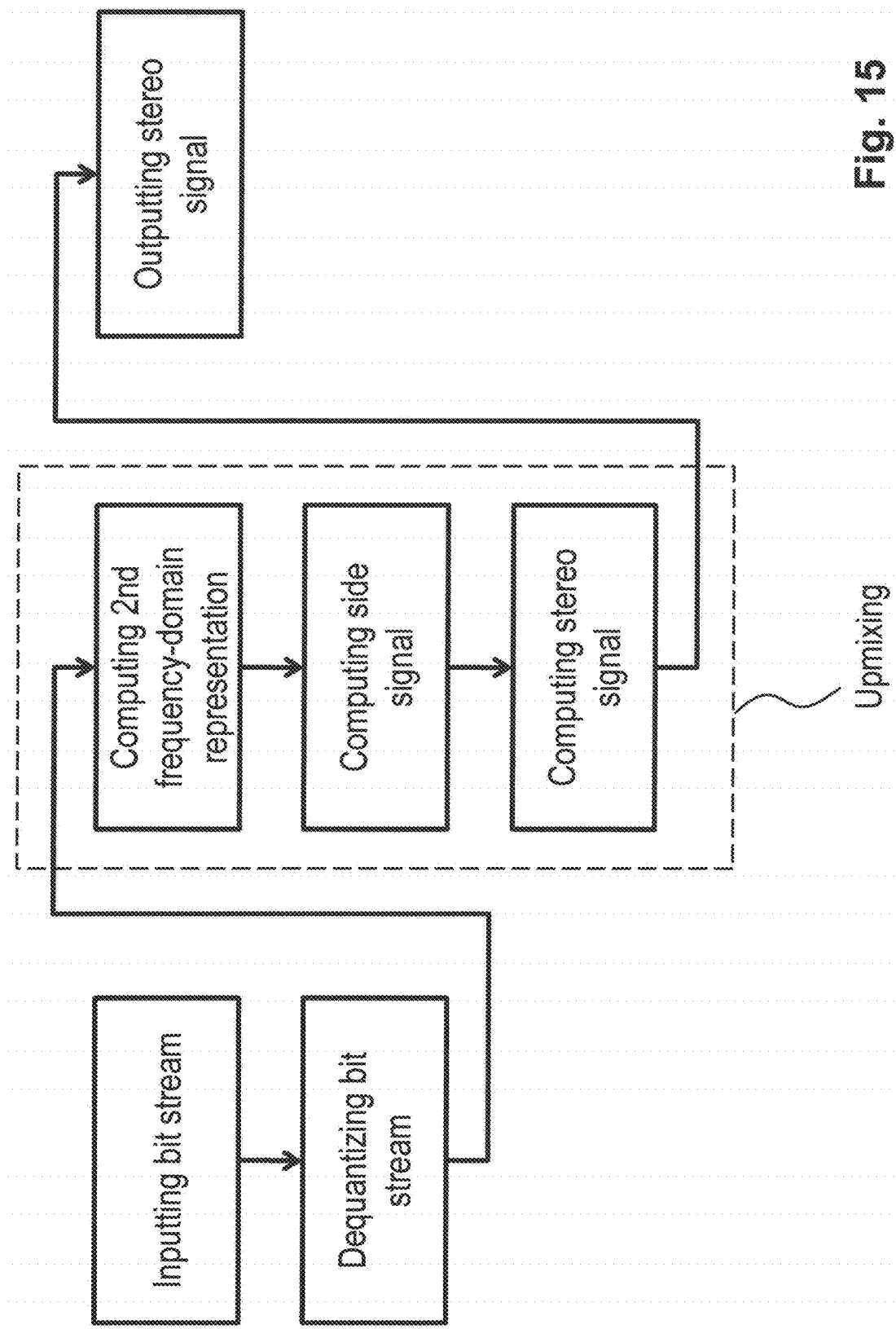
FIG. 15 is a flowchart showing a decoding method according to an embodiment of the invention.
Figure 16:
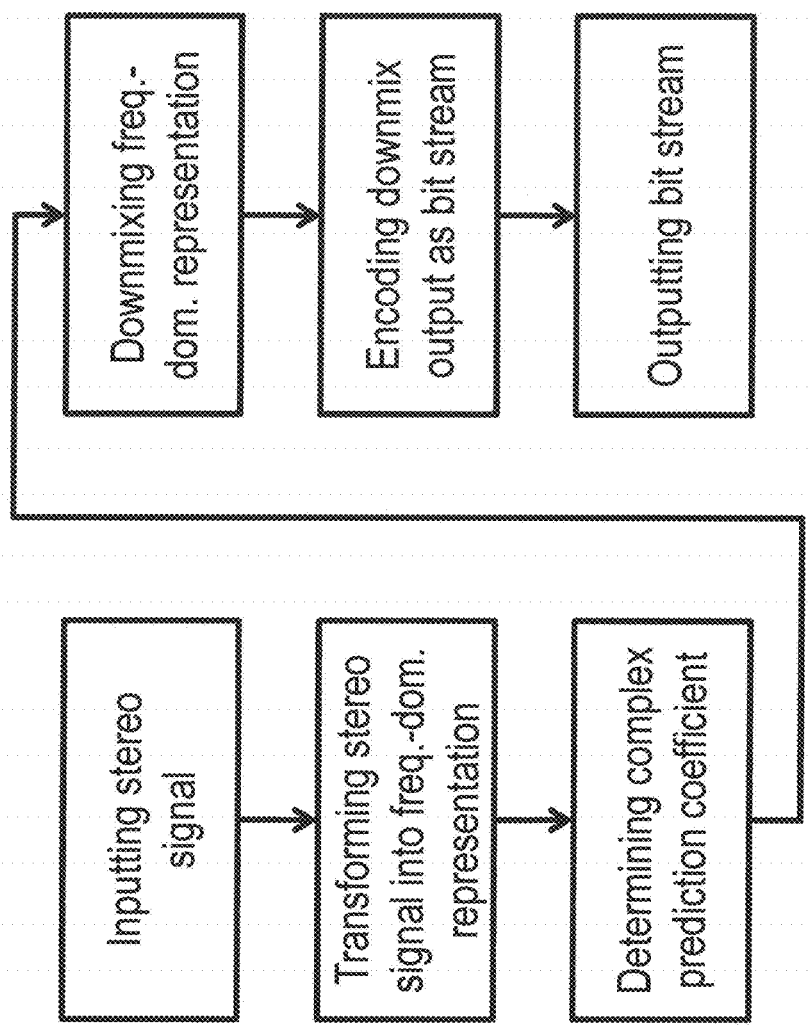
FIG. 16 is a flowchart showing an encoding method according to an embodiment of the invention.

Embodiments of the third and a fourth aspects of the invention are shown in FIGS. 15 and 16. FIG. 15 shows a method for decoding a bit stream into a stereo signal, comprising the following steps:
1. A bit stream is input.
2. The bit stream is dequantized, whereby a first frequency-domain representation of downmix and residual channels of a stereo signal are obtained.
3. A second frequency-domain representation of the downmix channel is computed.
4. A side channel signal is computed on the basis of the three frequency-domain representations of channels.
5. A stereo signal, preferably in left/right form, is computed on the basis of the side and the downmix channels.
6. The stereo signal thus obtained is output.

Steps 3 through 5 may be regarded as a process of upmixing. Each of steps 1 through 6 is analogous to the corresponding functionality in any of the decoder systems disclosed in the preceding portions of this text, and further details relating to its implementation can be retrieved in the same portions.

FIG. 16 shows a method for encoding a stereo signal as a bit stream signal, comprising the following steps:
1. A stereo signal is input.
2. The stereo signal is transformed into a first frequency-domain representation.
3. A complex prediction coefficient is determined.
4. The frequency-domain representation is downmixed.
5. The downmix and residual channels are encoded as a bit stream together with the complex prediction coefficient.
6. The bit stream is output.

Each of steps 1 through 5 is analogous to the corresponding functionality in any of the encoder systems disclosed in the preceding portions of this text, and further details relating to its implementation can be retrieved in the same portions.

Both methods may be expressed as computer-readable instructions in the form of software programs and may be executed by a computer. The scope of protection of this invention extends to such software and computer-program products for distributing such software.

IV. Empirical Evaluation

Several of the embodiments disclosed herein have been empirically assessed. The most important portions of the experimental material obtained in this process will be summarized in this subsection.

The embodiment used for the experiments had the following characteristics:
(i) Each MDST spectrum (for a time frame) was computed by two-dimensional finite impulse response filtering from current, previous and next MDCT spectra.
(ii) A psychoacoustic model from USAC stereo encoder was used.
(iii) The real and imaginary parts of the complex prediction coefficient $\alpha$ were transmitted instead of the PS parameters ICC, CLD and IPD. The real and imaginary parts were handled independently, were limited to the range [−3.0, 3.0] and quantized using a step size of 0.1. They were then time-differentially coded and finally Huffman coded using the scale factor codebook of the USAC. The prediction coefficients were updated every second scale-factor band, which resulted in a frequency resolution similar to that of MPEG Surround (see, e.g., ISO/IEC 23003-1). This quantization and coding scheme resulted in an average bit rate of approximately 2 kb/s for this stereo side information in a typical configuration with a target bit rate of 96 kb/s.
(iv) The bit stream format was modified without breaking current USAC bit streams, as the 2-bit ms_mask_present bit stream element currently has only three possible values. By using the fourth value to indicate complex prediction allows for a fallback mode of basic mid/side coding without any bits wasted (for further details on this subject, see the previous subsection of this disclosure).

The listening tests were accomplished according to the MUSHRA methodology, entailing in particular playback over headphones and the use of 8 test items with a sampling rate of 48 kHz. Three, five or six test subjects participated in each test.

Figure 12:
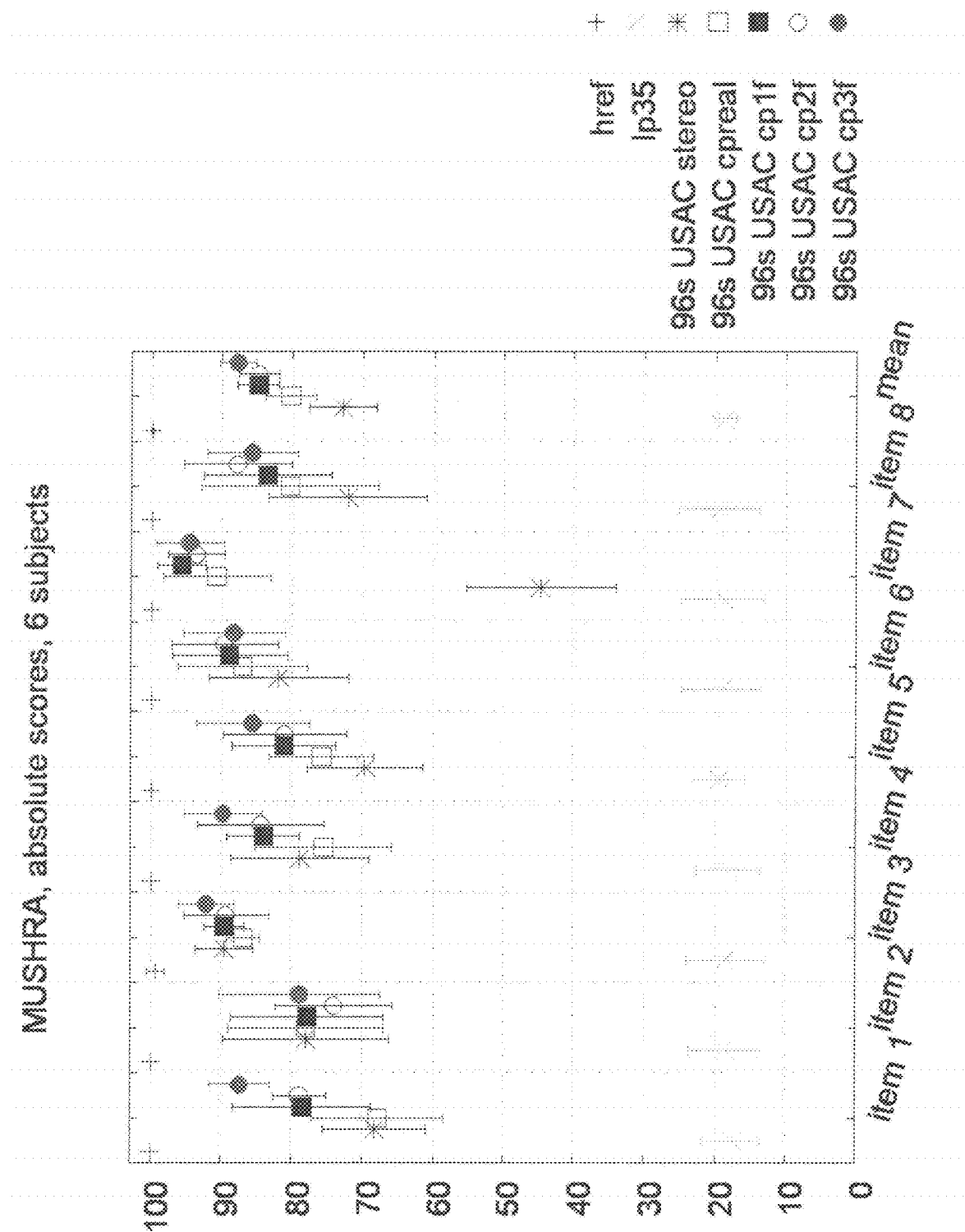
FIG. 12 is a graphical presentation of listening test results at 96 kb/s from six subjects showing different complexity-quality trade-off options for the computation or approximation of the MDST spectrum, wherein data points labeled "+" refer to hidden reference, "x" refer to 3.5 kHz band-limited anchor, "*" refer to USAC traditional stereo (M/S or L/R), "□" refer to MDCT-domain unified stereo coding by complex prediction with imaginary part of prediction coefficient disabled (i.e., real-valued prediction, requiring no MDST), "■" refer to MDCT-domain unified stereo coding by complex prediction using a current MDCT frame to compute an approximation of the MDST, "○" refer to MDCT-domain unified stereo coding by complex prediction using current and previous MDCT frames to compute an approximation of the MDST and "●" refer to MDCT-domain unified stereo coding by complex prediction using current, previous and next MDCT frames to compute the MDST.
Figure 13:
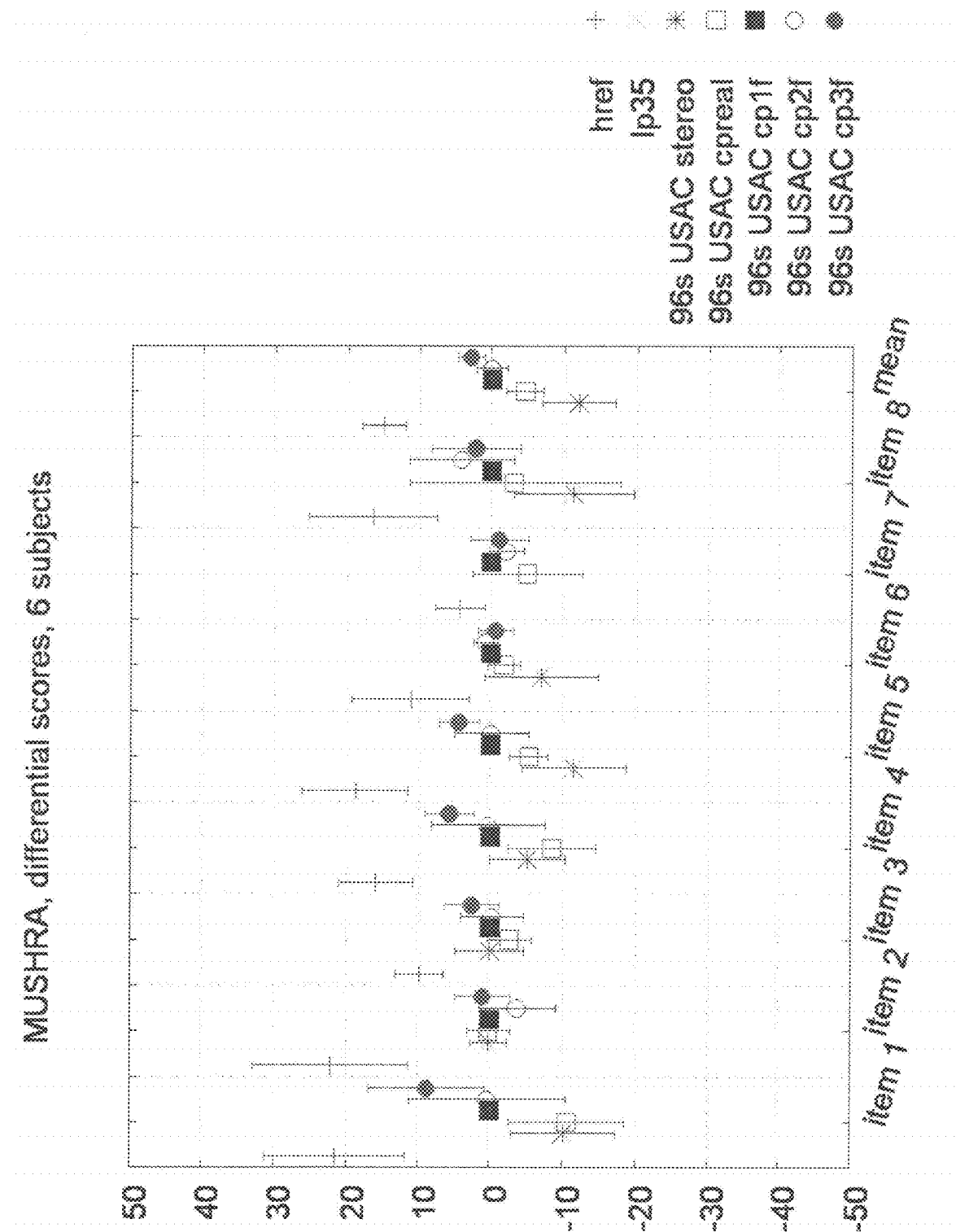
FIG. 13 presents the data of FIG. 12, however as differential scores relative to MDCT-domain unified stereo coding by complex prediction using a current MDCT frame to compute an approximation of the MDST.

The impact of different MDST approximations was evaluated to illustrate the practical complexity-to-quality trade-off that exists between these options. The results are found in FIGS. 12 and 13, the former showing absolute scores obtained and the latter showing differential scores relative to 96s USAC cp1f, that is, MDCT-domain unified stereo coding by complex prediction using a current MDCT frame to compute an approximation of the MDST. It can be seen that the quality gain achieved by MDCT-based unified stereo coding increases when more computationally complex approaches to computing the MDST spectrum are applied. Considering the average over all test, the single-frame-based system 96s USAC cp1f provides a significant increase in coding efficiency over conventional stereo coding. In turn, even significantly better results are obtained for 96s USAC cp3f, namely MDCT-domain unified stereo coding by complex prediction using current, previous and next MDCT frames to compute the MDST.

V. Embodiments

Further, the invention may be embodied as a decoder system for decoding a bit stream signal into a stereo signal by complex prediction stereo coding, the decoder system comprising:
a dequantization stage (202; 401) for providing first frequency-domain representations of a downmix signal (M) and a residual signal (D) based on the bit stream signal, each of the first frequency-domain representations comprising first spectral components representing spectral content of the corresponding signal expressed in a first subspace of a multidimensional space, wherein the first spectral components are transform coefficients arranged in one or more time frames of transform coefficients, each block generated by application of a transform to a time segment of a time-domain signal; and an upmix stage (206, 207, 210, 211; 406, 407, 408, 409) arranged downstream of the dequantization stage, adapted to generate the stereo signal based on the downmix signal and the residual signal and comprising:

a module (206; 408) for computing a second frequency-domain representation of the downmix signal based on the first frequency-domain representation thereof, the second frequency-domain representation comprising second spectral components representing spectral content of the signal expressed in a second subspace of the multidimensional space that includes a portion of the multidimensional space not included in the first subspace, said module being adapted to:

derive one or more first intermediate components from at least some of the first spectral components;

form a combination of said one or more first spectral components according to at least a portion of one or more impulse responses to obtain one or more second intermediate components; and derive said one or more second spectral components from said one or more second intermediate components;

a weighted summer (210, 211; 406, 407) for computing a side signal (S) on the basis of the first and second frequency-domain representations of the downmix signal, the first frequency-domain representation of the residual signal and a complex prediction coefficient ($\alpha$) encoded in the bit stream signal; and a sum-and-difference stage (207; 409) for computing the stereo signal on the basis of the first frequency-domain representation of the downmix signal and the side signal.

Further still, the invention may be embodied as a decoder system for decoding a bit stream signal into a stereo signal by complex prediction stereo coding, the decoder system comprising:

a dequantization stage (301) for providing first frequency-domain representations of a downmix signal (M) and a residual signal (D) based on the bit stream signal, each of the first frequency-domain representations comprising first spectral components representing spectral content of the corresponding signal expressed in a first subspace of a multidimensional space; and an upmix stage (306, 307, 308, 309, 312) arranged downstream of the dequantization stage, adapted to generate the stereo signal based on the downmix signal and the residual signal and comprising:

a module (306, 307) for computing a second frequency-domain representation of the downmix signal based on the first frequency-domain representation thereof, the second frequency-domain representation comprising second spectral components representing spectral content of the signal expressed in a second subspace of the multidimensional space that includes a portion of the multidimensional space not included in the first subspace, the module comprising:

an inverse transform stage (306) for computing a time-domain representation of the downmix signal on the basis of the first frequency-domain representation of the downmix signal in the first subspace of the multidimensional space; and a transform stage (307) for computing the second frequency-domain representation of the downmix signal on the basis of the time-domain representation of the signal;

a weighted summer (308, 309) for computing a side signal (S) on the basis of the first and second frequency-domain representations of the downmix signal, the first frequency-domain representation of the residual signal and a complex prediction coefficient ($\alpha$) encoded in the bit stream signal; and a sum-and-difference stage (312) for computing the stereo signal on the basis of the first frequency-domain representation of the downmix signal and the side signal.

VI. Closing Remarks

Further embodiments of the present invention will become apparent to a person skilled in the art after reading the description above. Even though the present description and drawings disclose embodiments and examples, the invention is not restricted to these specific examples. Numerous modifications and variations can be made without departing from the scope of the present invention, which is defined by the accompanying claims.

It is noted that the methods and apparatus disclosed in this application may be applied, after appropriate modifications within the skilled person's abilities including routine experimentation, to coding of signals having more than two channels. It is particularly emphasized that any signals, parameters and matrices mentioned in connections with the described embodiments may be frequency-variant or frequency-invariant and/or time-variant or time-invariant. The described computing steps may be carried out frequency-wise or for all frequency bands at a time, and all entities may be embodied to have a frequency-selective action. For the purposes of the application, any quantization schemes may be adapted according to psycho-acoustic models. It is moreover noted that the various sum-and-difference conversions, that is, the conversion from downmix/residual form to pseudo-L/R form as well as the L/R-to-M/S conversion and the M/S-to-L/R conversion, are all of the form $$g\begin{bmatrix} 1 & 1 \\ 1 & -1 \end{bmatrix}.$$

where, merely, the gain factor g may vary. Thus, by adjusting gain factors individually, it is possible to compensate a certain encoding gain by an appropriate choice of decoding gain. Moreover, as the skilled person realises, an even number of serially arranged sum-and-difference transforms have the effect of a pass-through stage, possibly with non-unity gain.

The systems and methods disclosed hereinabove may be implemented as software, firmware, hardware or a combination thereof. Certain components or all components may be implemented as software executed by a digital signal processor or microprocessor, or be implemented as hardware or as an application-specific integrated circuit. Such software may be distributed on computer readable media, which may comprise computer storage media and communication media. As is well known to a person skilled in the art, computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is known to the skilled person that communication media typically embodies computer readable instructions, data structures, program modules or other data in a modulated data signal such as a carrier wave or other transport mechanism and includes any information delivery media.

What is claimed is:

1. An apparatus for outputting a stereo audio signal having a left channel and a right channel, the apparatus comprising:
    a demultiplexer configured to receive an audio bitstream and decode therefrom at least one prediction coefficient, wherein the audio bitstream is segmented into frames and values of the at least one prediction coefficient may change for each of the frames;
    a decoder configured to generate a downmix signal and a residual signal from the audio bitstream; and
    an upmixer configured to operate in either a prediction mode or a non-prediction mode, and to output the left channel and the right channel as the stereo audio signal,
    wherein, when the upmixer operates in the prediction mode, the residual signal represents a difference between a side signal and a predicted version of the side signal, and the upmixer generates the left channel and the right channel from a combination of the downmix signal, the residual signal, and the at least one prediction coefficient, and
    wherein, when the upmixer operates in the non-prediction mode, the residual signal represents the side signal, the upmixer generates the left channel based on a sum of the downmix signal and the residual signal, and the upmixer generates the right channel based on a difference of the downmix signal and the residual signal.

2. The apparatus of claim 1 wherein the at least one prediction coefficient reduces or minimizes an energy of the residual signal.

3. The apparatus of claim 1 further comprising a noise shaper configured to shape a noise associated with the downmix signal, wherein the noise shaper is arranged upstream of the upmixer.

4. The apparatus of claim 3 wherein the noise shaper is a temporal noise shaper configured to shape the noise over time.

5. The apparatus of claim 1 wherein, when the upmixer operates in the prediction mode, the upmixer generates the left channel and the right channel using a filter having three taps.

6. The apparatus of claim 1 wherein the downmix signal comprises a mid signal formed by a linear combination of an original left channel and an original right channel.

7. The apparatus of claim 1 wherein the at least one prediction coefficient is a real valued coefficient.

8. The apparatus of claim 1 wherein the at least one prediction coefficient is a complex valued coefficient.

9. The apparatus of claim 1 wherein the upmixer combines the side signal with the downmix signal by adding a version of the downmix signal with a version of the side signal to generate the left channel and by subtracting the version of the side signal from the version of the downmix signal to generate the right channel.

10. The apparatus of claim 1 wherein the upmixer is further configured to add the residual signal to the side signal when operating in the prediction mode.

11. The apparatus of claim 1 wherein the downmix signal is partitioned into frequency bands, the at least one prediction coefficient comprises a prediction coefficient for each of the frequency bands, the demultiplexer is configured to receive the audio bitstream and decode therefrom each of the prediction coefficients, and the upmixer, when operating in the prediction mode, generates the left channel and the right channel from a combination of the downmix signal, the residual signal, and each of the prediction coefficients.

12. A method for outputting a stereo audio signal having a left channel and a right channel, the method comprising:
    receiving an audio bitstream and decoding therefrom at least one prediction coefficient, wherein the audio bitstream is segmented into frames and values of the at least one prediction coefficient may change for each of the frames;
    generating in a decoder a downmix signal and a residual signal from the audio bitstream;
    upmixing in either a prediction mode or a non-prediction mode; and
    outputting the left channel and the right channel as the stereo audio signal,
    wherein, when the upmixing operates in the prediction mode, the residual signal represents a difference between a side signal and a predicted version of the side signal, and the upmixing generates the left channel and the right channel from a combination of the downmix signal, the residual signal, and the at least one prediction coefficient, and
    wherein, when the upmixing operates in the non-prediction mode, the residual signal represents the side signal, and the upmixing generates the left channel based on a sum of the downmix signal and the residual signal passed through from the decoder, and generates the right channel based on a difference of the downmix signal and the residual signal.

13. A non-transitory computer-readable medium containing instructions that when executed by a processor perform the method of claim 12.

* * * * *